United States Patent
Agarwal

(10) Patent No.: US 8,325,664 B2
(45) Date of Patent: *Dec. 4, 2012

(54) TERMINAL SLOT ASSIGNMENT FOR A SATELLITE COMMUNICATIONS SYSTEM

(75) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/615,720

(22) Filed: Nov. 10, 2009

(65) Prior Publication Data

US 2010/0118769 A1    May 13, 2010

Related U.S. Application Data

(60) Provisional application No. 61/112,927, filed on Nov. 10, 2008.

(51) Int. Cl.
| | |
|---|---|
| H04W 4/00 | (2009.01) |
| H04W 72/00 | (2009.01) |
| H04J 3/22 | (2006.01) |
| H04B 7/185 | (2006.01) |

(52) U.S. Cl. ....... 370/329; 370/316; 370/468; 455/12.1; 455/452.1

(58) Field of Classification Search ....... 370/229–235.1, 370/312, 321, 324, 326, 329, 336, 468, 522; 455/12.1, 77, 427, 450, 452.1, 447
See application file for complete search history.

(56) References Cited

U.S. PATENT DOCUMENTS

| | | |
|---|---|---|
| 5,216,427 A | 6/1993 | Yan et al. |
| 5,552,920 A | 9/1996 | Glynn |
| 5,790,070 A | 8/1998 | Natarajan et al. |
| 5,914,944 A | 6/1999 | Haugli et al. |
| 6,037,983 A | 3/2000 | Au et al. |
| 6,091,936 A | 7/2000 | Chennakeshu et al. |
| 6,574,794 B1 | 6/2003 | Sarraf et al. |
| 7,027,414 B2 * | 4/2006 | Walsh et al. .................. 370/316 |
| 7,130,283 B2 * | 10/2006 | Vogel et al. .................... 370/322 |
| 7,366,134 B2 | 4/2008 | Bose et al. |
| 7,382,743 B1 | 6/2008 | Rao et al. |
| 7,729,244 B2 * | 6/2010 | Sadr .............................. 370/230 |
| 7,751,320 B2 * | 7/2010 | Nuzman et al. ............... 370/230 |

(Continued)

FOREIGN PATENT DOCUMENTS

EP    1089459 A2    4/2001

(Continued)

OTHER PUBLICATIONS

PCT Application No. PCT/US2010/038721, International Search Report dated Oct. 19, 2010, 13 pages.

(Continued)

*Primary Examiner* — Habte Mered

(74) *Attorney, Agent, or Firm* — Holland & Hart LLP

(57) ABSTRACT

Novel satellite communications systems, methods, and related devices are described. In some embodiments, a satellite communications system is configured to dynamically allocate bandwidth to terminals. Such a system may be made up of a satellite in communication with terminals (e.g., user terminals or gateways). The satellite or a Network Control Center (NCC) may receive and compile bandwidth request data from the terminals. In each of a series of one or more epochs, and according to the bandwidth requests, the satellite and/or NCC may allocate carrier group resources to particular traffic classes. The assignment of allocated resources to particular terminals is also described.

24 Claims, 14 Drawing Sheets

U.S. PATENT DOCUMENTS

| | | | |
|---|---|---|---|
| 7,936,707 B2 * | 5/2011 | Kota et al. | 370/316 |
| 7,945,269 B2 * | 5/2011 | Drakos | 455/450 |
| 8,085,802 B1 | 12/2011 | Monk et al. | |
| 2001/0049284 A1 | 12/2001 | Liu et al. | |
| 2002/0027896 A1 | 3/2002 | Hughes et al. | |
| 2002/0054576 A1 | 5/2002 | Gobbi | |
| 2002/0159403 A1 | 10/2002 | Reddy | |
| 2002/0176398 A1 | 11/2002 | Nidda | |
| 2003/0031141 A1 | 2/2003 | Schweinhart et al. | |
| 2003/0069043 A1 | 4/2003 | Chhaochharia et al. | |
| 2004/0100941 A1 | 5/2004 | Lim | |
| 2004/0192376 A1 | 9/2004 | Grybos | |
| 2004/0219923 A1 | 11/2004 | Oses et al. | |
| 2005/0037764 A1 * | 2/2005 | Trachtman | 455/450 |
| 2005/0053033 A1 | 3/2005 | Kelly et al. | |
| 2005/0227618 A1 | 10/2005 | Karabinis et al. | |
| 2007/0195817 A1 | 8/2007 | Denney et al. | |
| 2008/0001812 A1 | 1/2008 | Jalali | |
| 2008/0062028 A1 | 3/2008 | Chang | |
| 2008/0080451 A1 | 4/2008 | Rofougaran | |
| 2008/0146145 A1 | 6/2008 | Pateros et al. | |
| 2008/0219266 A1 * | 9/2008 | Agarwal et al. | 370/392 |
| 2008/0233865 A1 | 9/2008 | Malarky et al. | |
| 2008/0320540 A1 | 12/2008 | Brooks et al. | |
| 2009/0109895 A1 | 4/2009 | Kota et al. | |
| 2010/0034107 A1 | 2/2010 | Chin et al. | |
| 2010/0118764 A1 | 5/2010 | Agarwal | |
| 2010/0118765 A1 | 5/2010 | Agarwal | |
| 2010/0118766 A1 | 5/2010 | Agarwal | |
| 2010/0118767 A1 | 5/2010 | Agarwal | |
| 2010/0120357 A1 | 5/2010 | Agarwal | |
| 2010/0120359 A1 | 5/2010 | Agarwal | |
| 2010/0120418 A1 | 5/2010 | Agarwal | |
| 2010/0238869 A1 | 9/2010 | Bruin et al. | |
| 2010/0255776 A1 | 10/2010 | Hudson et al. | |
| 2010/0315949 A1 | 12/2010 | Agarwal | |
| 2011/0034166 A1 | 2/2011 | Karabinis et al. | |

FOREIGN PATENT DOCUMENTS

| | | |
|---|---|---|
| WO | WO 99-49590 A1 | 9/1999 |
| WO | WO 2004-073229 A2 | 8/2004 |
| WO | WO-2008-100341 A2 | 8/2008 |
| WO | WO 2008-109860 A2 | 9/2008 |

OTHER PUBLICATIONS

PCT Application No. PCT/US2009/063919, International Search Report dated Jun. 22, 2010, 4 pages.
PCT Application No. PCT/US2009/063914, International Search Report dated Jun. 28, 2010, 16 pages.
PCT Application No. PCT/US2009/063917, International Search Report dated Jun. 24, 2010, 13 pages.
Non-final Office Action, U.S. Appl. No. 12/615,483, dated Feb. 2, 2012, 20 pgs.
International Preliminary Report on Patentability, Int'l App. No. PCT/US2009/063919, dated May 19, 2011, 6 pgs.
Non-final Office Action, U.S. Appl. No. 12/615,709, dated Mar. 14, 2012, 21 pgs.
Non-final Office Action, U.S. Appl. No. 12/615,735, dated Mar. 1, 2012, 20 pgs.
International Preliminary Report on Patentability, Int'l App. No. PCT/US2009/063917, dated May 19, 2011, 8 pgs.
Non-final Office Action, U.S. Appl. No. 12/615,488, dated Feb. 28, 2012, 19 pgs.
Non-final Office Action, U.S. Appl. No. 12/615,491, dated Feb. 27, 2012, 30 pgs.
Notice of Allowance, U.S. Appl. No. 12/615,499, dated Jan. 27, 2012, 15 pgs.
International Preliminary Report on Patentability, Int'l App. No. PCT/US2009/063914, dated May 19, 2011, 11 pgs.
International Preliminary Report on Patentability, Int'l App. No. PCT/US2010/038721, dated Dec. 29, 2011, 8 pgs.
Non-final Office Action dated Oct. 12, 2012, U.S. Appl. No. 13/569,641, 19 pgs.
Non-final Office Action dated Aug. 2, 2012, U.S. Appl. No. 12/615,488, 21 pgs.
Notice of Allowance dated Sep. 28, 2012, U.S. Appl. No. 12/615,491, 15 pgs.
Notice of Allowance dated Oct. 15, 2012, U.S. Appl. No. 12/615,499, 12 pgs.
Non-final Office Action dated Aug. 22, 2012, U.S. Appl. No. 12/615,512, 24 pgs.

* cited by examiner

| Terminal Id | Terminal Priority | Mode | Class | Min SR | CIR | RIR |
|---|---|---|---|---|---|---|
| 1 | 3 | Burst Size, Modulation | 0 | 32 | 100 | 50 |
| | | | 1 | 64 | 0 | 200 |
| | | | 2 | 0 | 100 | 100 |
| | | | 3 | 0 | 200 | 200 |

FIG. 3

TERMINAL SLOT ASSIGNMENT FOR A SATELLITE COMMUNICATIONS SYSTEM

CROSS-REFERENCES

This application claims the benefit of co-pending U.S. provisional application Ser. No. 61/112,927, filed on Nov. 10, 2008, titled "DYNAMIC BANDWIDTH RESOURCE ALLOCATION," which is hereby expressly incorporated by reference in its entirety for all purposes.

This application is related to the following commonly assigned patent applications:

U.S. patent application Ser. No. 12/615,709, filed Nov. 10, 2009, entitled "TRAFFIC CLASS POOL SIZING FOR A SATELLITE COMMUNICATIONS SYSTEM"; and
U.S. patent application Ser. No. 12/615,735, filed Nov. 10, 2009, entitled "RESOURCE FAIRNESS POLICIES FOR ALLOCATION OF RESOURCES IN A SATELLITE COMMUNICATIONS SYSTEM"; each of which is hereby expressly incorporated by reference in its entirety for all purposes.

This application is also related to the following applications:

U.S. patent application Ser. No. 12/615,488, filed Nov. 10, 2009, entitled "BANDWIDTH ALLOCATION ACROSS BEAMS IN A MULTI-BEAM SYSTEM";
U.S. patent application Ser. No. 12/615,491, filed Nov. 10, 2009, entitled "CARRIER GROUP APPORTIONMENT FOR A SATELLITE COMMUNICATIONS SYSTEM";
U.S. patent application Ser. No. 12/615,499, filed Nov. 10, 2009, entitled "APPORTIONED CARRIER GROUP SLOT PLACEMENT FOR A SATELLITE COMMUNICATIONS SYSTEM";
U.S. patent application Ser. No. 12/615,512, filed Nov. 10, 2009, entitled "TERMINAL MODE ASSIGNMENT FOR A SATELLITE COMMUNICATIONS SYSTEM"; and
U.S. patent application Ser. No. 12/615,483, filed Nov. 10, 2009, entitled "DYNAMIC FREQUENCY ASSIGNMENT IN A MULTI-BEAM SYSTEM".

BACKGROUND

The present invention relates to satellite communications in general and, in particular, to resource allocation.

Satellite communications systems often have a limited amount of available bandwidth to be allocated to terminals. In many system designs, a set amount of such bandwidth is allocated. The bandwidth needs for the terminals may change over time. Moreover, different terminals may have different priority levels, have varying service level agreements, and carry different types of traffic.

It may, therefore, be desirable to utilize a system design in which bandwidth is allocated to terminals dynamically, in response to bandwidth requests and various quality of service metrics.

BRIEF SUMMARY

Novel satellite communications systems, methods, and related devices are described. In some embodiments, a satellite communications system is configured to dynamically allocate resources to traffic classes and particular terminals. Such a system may be made up of a satellite in communication with terminals (e.g., user terminals or gateways). The satellite, or a Network Control Center (NCC), in communication with one or more terminals, may receive and compile bandwidth request data from the terminals. Over some time period (e.g., a set of one or more epochs), and according to the bandwidth requests, embodiments of the satellite and/or NCC may allocate the resources of different carrier groups to particular traffic classes. For example, uplink bandwidth of the satellite communications system may be allocated among different traffic classes according to bandwidth obligations, including minimum sustained rate (MinSR), committed information rate (CIR), and requested information rate (RIR).

In some embodiments, after initial allocations of resources within a carrier group are made (e.g., according to the traffic class requests and/or other information), time slots may be assigned to terminals. For example, the uplink bandwidth of the satellite communications system allocated among traffic classes may be assigned to particular terminals in the form of time slots. This assignment may be according to bandwidth obligations, including terminal priority, traffic class, and MinSR, CIR, and/or RIR requests.

In other embodiments, the satellite communications system is configured to dynamically allocate bandwidth to terminals when resources are insufficient to meet all bandwidth requests. For example, it may be determined that bandwidth resources are insufficient to meet aggregate MinSR, CIR, and/or RIR requests. In some embodiments, a sharing policy provides priority or weighted allocations to the particular traffic classes. Allocations may also be in proportion to the CIR requests for one or more classes at one or more terminals. Proportional, Weighted Proportional, Fair Share, Weighted Fair Share, and other policies are described.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 is a diagram that illustrates a table of information that may be sent from a terminal to a satellite or NCC.

DETAILED DESCRIPTION

Novel satellite communications systems, methods, and related devices are described. In one embodiment, a satellite communications system is configured to dynamically allocate bandwidth (e.g., uplink bandwidth) among traffic classes, and assign the allocated bandwidth to terminals. Such a system may include a satellite in communication with terminals (e.g., terminals or gateways). The satellite may receive and compile bandwidth request data from the terminals, and provide full mesh connectivity between terminals. A network control center (NCC), alone or in combination with functionality on the satellite, may also be configured to perform bandwidth allocation functionality described herein.

The following description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Figure 1:
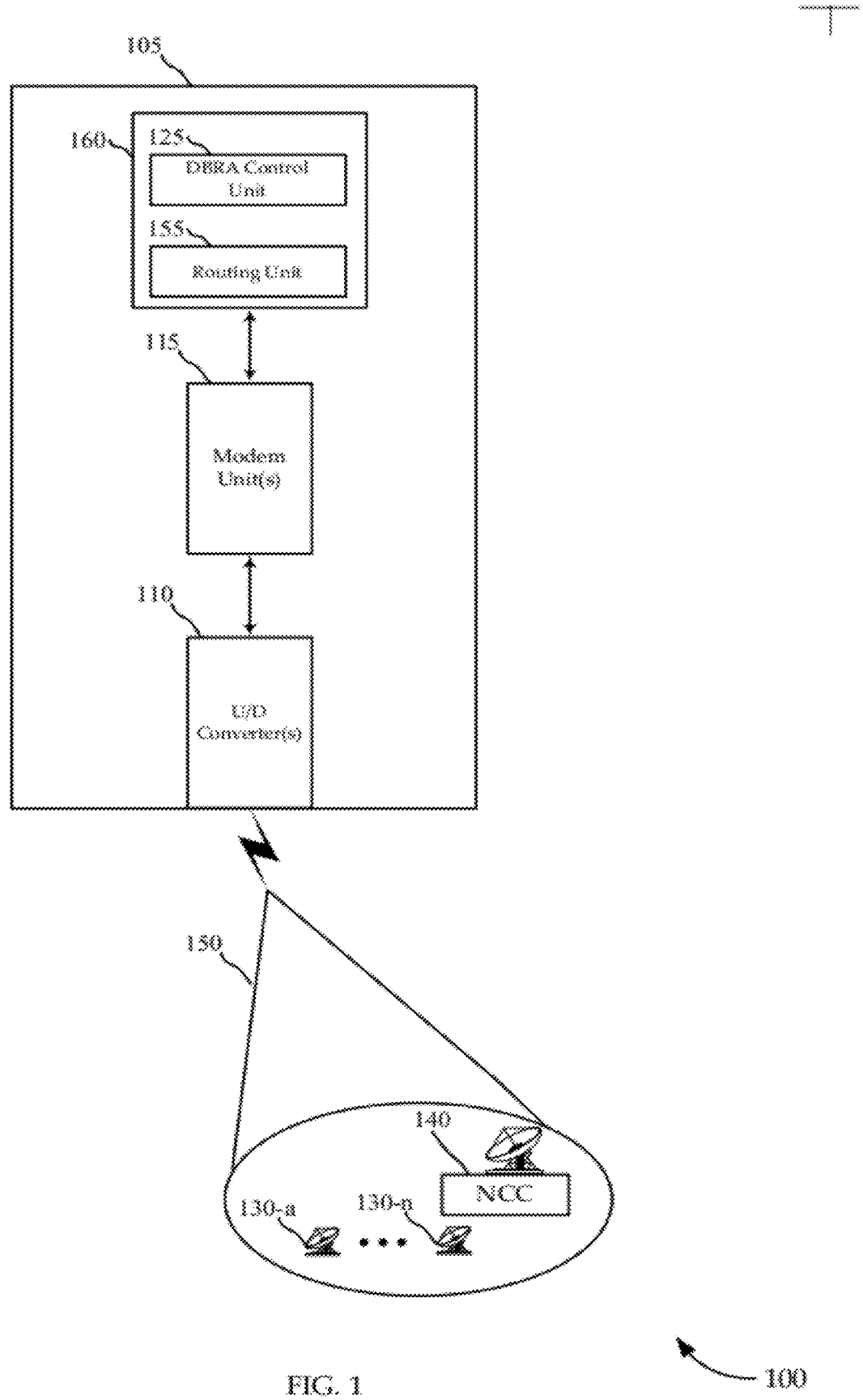
FIG. 1 is a high level block diagram illustrating a satellite communications system according to various embodiments of the invention.

Systems, devices, methods, and software are described for a satellite communications system, wherein the system is configured to include novel bandwidth allocation functionality. FIG. 1 is a high level block diagram illustrating a satellite communications system 100 according to various embodiments of the invention. The system includes a satellite 105 in communication with terminals 130 (e.g., subscriber terminals or gateways), and a network control center (NCC) 140. The satellite 105 in the illustrated embodiment includes a single beam 150 for a particular coverage area (note that in other embodiments, there may be a multiple beam satellite). Respective U/D converters 110 may receive signals transmitted via the terminals 130, and transmit signals to terminals 130. The U/D converters 110 may be configurable to receive different frequency ranges at different times. U/D converters 110 are in communication with modem units 115, which may provide a range of modulator and demodulator functionality described in more detail below. The modem units 115 are in communication with a control unit 160 (including DBRA control unit 125 and routing unit 155), which may manage and allocate system and satellite 105 resources (e.g., as described with reference to FIGS. 7-13, below).

In one embodiment, the DBRA control unit 125 onboard satellite 105 manages bandwidth resources (e.g., ranges of frequencies, and time slots therein) and assigns them to terminals 130. While these allocations are primarily discussed herein for uplink communications (e.g., from the terminals 130 to the satellite 105 or NCC 140), the allocations may additionally or alternatively be for downlink communications. To accomplish these allocations, the DBRA control unit 125 dynamically manages both bandwidth resources and satellite 105 resources (e.g., routing and switching functionality, U/D converter frequencies, demodulators, modulators, buffers, etc.). DBRA resource management decisions may be driven by terminals 130, as the DBRA control unit 125 may receive terminal 130 resource requests and link characteristics, and assign frequencies and slots to terminals dynamically based on service level agreements (SLAs) and terminal priority, for example. Various types of bandwidth resources and/or satellite 105 resources are described generally herein as "resource units." For example, a resource unit may include an assignable or allocatable time slot, frequency sub-band, or any other type of system or satellite resource. Further, the resource units may not correspond to other units of measurement (e.g., each time slot resource unit does not necessarily represent a single time slot), and should therefore be broadly construed, for example as any type of quantization that is useful for allocation. It is worth noting that, in some embodiments, one or more of the DBRA control unit 125 functions described herein may be performed by the NCC 140 (e.g., acting as a gateway).

Terminals 130 may be any mobile or fixed communication device. Terminals 130 (which may include the NCC 140) may request particular amounts of uplink and/or downlink bandwidth for different traffic types, and may consume varying amounts of resources for different types of traffic, using varying link condition dependent uplink modes. The DBRA control unit 125 may be configured to allocate the appropriate amount of resources at the right mode to each terminal. It may utilize sharing rules (policies, schemes, etc.) to allocate resources among terminals when demand exceeds resource availability, providing preferences to higher priority terminals and terminal traffic that conform to the SLAs. In some embodiments, terminal 130 SLAs provide information about how much traffic of a given traffic class is guaranteed to a terminal (CIR). Multi-level CIR may be used to provide the capability to break up the CIR into multiple levels, in increasing order of priority.

One or more modem units 115 may receive a signal (e.g., an intermediate frequency (IF) signal) from, or output a signal to, an associated U/D converter 110. Each modem unit 115 may provide some or all of the physical, link, and MAC layer functions for signals received from terminals 130. In another embodiment, a single integrated modem device may support two or more of the channels by housing two or more logical modem units 115. Other modem configurations may be used as well, as evident to those skilled in the art. A variety of functions may be performed by the modems units 115, such as a) modulation, coding, framing, time-division multiple access (TDMA); b) dynamic/adaptive/variable modulation/coding; c) frequency and/or power management; d) master, or secondary, reference terminal functions, including acquisition and synchronization support and link quality measurements (e.g., measuring frequency, timing, or power of one or more received signals); e) packet segmentation and reassembly; f) dynamic TDMA bandwidth request; g) packet queuing, scheduling, and queue management; and/or h) internet protocol (IP) packet routing and forwarding. In other embodiments, one or more of these functions may be performed by the NCC 140.

The routing unit 155, in communication with the modem unit(s) 115, may provide the layer 3 functionality or other routing functionality (instead of the modem unit(s) 115). The routing unit 155 (or the modem unit(s) 115) may perform a variety of routing functions including: a) IP routing for various protocols (RIP, BGP, OSPF, PIM) and multicast replication; b) traffic conditioning, policing, and access control; and/or c) RSVP/ARSVP.

The NCC 140 may also provide network management services for modem units 115 and terminals 130. The NCC 140 may include the following functions: a) IP modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and/or f) interface with network management and router management.

Therefore, uplink and/or downlink bandwidth may be dynamically assigned to terminals 130 by the DBRA control unit 125 onboard satellite 105, the NCC 140, or any combination thereof. In some embodiments, dynamic assignment of bandwidth resources is implemented within, or includes, one or more types of static assignment. For example, in one embodiment, dynamic traffic class assignments are made for each time duration within a static, predetermined carrier group assignment (as explained more below). Terminals 130 may measure traffic flows and estimate uplink or downlink bandwidth requirements, and may send bandwidth requests periodically to the DBRA control unit 125, or to the NCC 140 (via satellite 105 or otherwise).

In the alternative, bandwidth needs may be estimated. Specific time slots in specific carriers may be dynamically allocated to individual terminals 130 based on requests and/or estimates. Time slots in specific downlink carriers may be allocated to individual modem units 115, perhaps for communication with particular terminals 130. The NCC 140 and/or the DBRA control unit 125 may include algorithms and software to efficiently perform dynamic bandwidth allocation for all terminals, while meeting CIR and fairness objectives.

System 100 parameters may be configurable using the NCC 140 and can be optimized even after the system is operational. Examples of such parameters include carrier sizing, spacing and number of carriers, number of bursts for control and management traffic, guard times between bursts, and rules for bandwidth allocation. In one embodiment, an off-path link is made available for managing modem unit(s) 115 and the DBRA control unit 125 (e.g., in case the on-path link becomes unavailable due to a software and/or hardware failure). This off-path link may be a slow access link. Thus, the NCC 140 may be configured to control, manage, and monitor the links of the system 100. The NCC 140 may monitor and control links in beams other than its own. The NCC 140, therefore, may perform near real-time capacity and dynamic bandwidth management in addition to configuration, accounting, performance, and security/authentication functions. The NCC 140 may host a web server to provide access to browser clients.

As noted above, although the communications system 100 is illustrated as a geostationary satellite-based communication system, various embodiments described herein are not limited to use in geostationary satellite-based systems. For example, some embodiments could be low earth orbit (LEO) satellite-based systems. The terminals 130 may include, for example, gateways or subscriber terminals (sometimes called user terminals). The system 100 may be a star, mesh, or hybrid, and may be implemented in an existing star, mesh, or hybrid system.

One or more computing devices may be connected locally (e.g., a LAN, with wired or wireless connectivity) with a terminal 130, and a connected terminal may be connected to a wider network, as well. Data and information, such as IP datagrams, may be sent from such a connected device through a terminal 130 and the satellite 105, and to another terminal 130 (or other satellite 105). A variety of physical layer transmission modulation and coding techniques may be used on links between the satellite 105 and terminal 130 (or other satellite 105), including those defined with the DVB-S2 and WiMAX standards. Different multiplexing schemes may be used as well, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art. In various embodiments, the physical layer techniques may be the same, or different, for downstream and upstream links between the satellite 105 and terminal 130 (or other satellite). In one embodiment, the system 100 will support binary phase shift keying (BPSK) and quadrature phase shift keying (QPSK) modulations and Viterbi and Reed-Solomon forward error correction (FEC). The system may additionally support 8-PSK and 16 QAM, and LDPC and Turbo code FEC.

In one embodiment, the uplink is in a multi-frequency time-division multiple access (MF-TDMA) format. The uplink spectrum is configured as N carriers, which may include different or configurable different symbol rates and carrier sizes. Each carrier is divided in time into fixed period frames, and each frame contains a number of variable sized time slots, or bursts. In general, each time slot may be dynamically assigned to and used by a terminal 130 for sending data. Each time slot may use a specific modulation and FEC coding rate, and contain one or more packet segments. User IP packets may be fragmented into packet segments and reassembled at the modem unit 115 before IP processing. Certain bursts are used for network control packets for terminal acquisition, terminal synchronization maintenance, and bandwidth requests. In one embodiment, the burst structures used may be the same as those used in existing mesh architectures.

A terminal 130 may use an antenna to transmit a signal to the satellite 105. In one embodiment, the antenna is a parabolic reflector with high directivity in the direction of the satellite and low directivity in other directions. The antenna may have a variety of alternative configurations and include operating features such as high isolation between orthogonal polarizations, high efficiency in the operational frequency bands, and low noise. Terminals with small antenna/HPA sizes and limited power may be accommodated by configuring a few small sized carriers (e.g., 384 or 512 ksps) on the uplink.

Terminals 130 may include existing, modified, and specifically configured terminals. Terminals 130 may include a small indoor unit (IDU) and an appropriately sized antenna and RF equipment (the outdoor unit (ODU)). The IDU may have a 10/100baseT Ethernet/IP interface as the user traffic interface. The IDU may provide IP router functionality to the user network. In one embodiment, terminals 130 are managed through the satellite 105 by the NCC 140. The NCC 140 may, therefore, be configured to allocate uplink or downlink bandwidth on carriers for these terminals, and send routing information to the terminals 130.

The satellite 105 may, for example, use a reflector antenna, lens antenna, array antenna, active antenna, or other mechanism known in the art for reception of such signals. The satellite 105 may process the signals received from a terminal 130, and then route and transmit the processed signal down to another terminal 130.

Figure 2A:
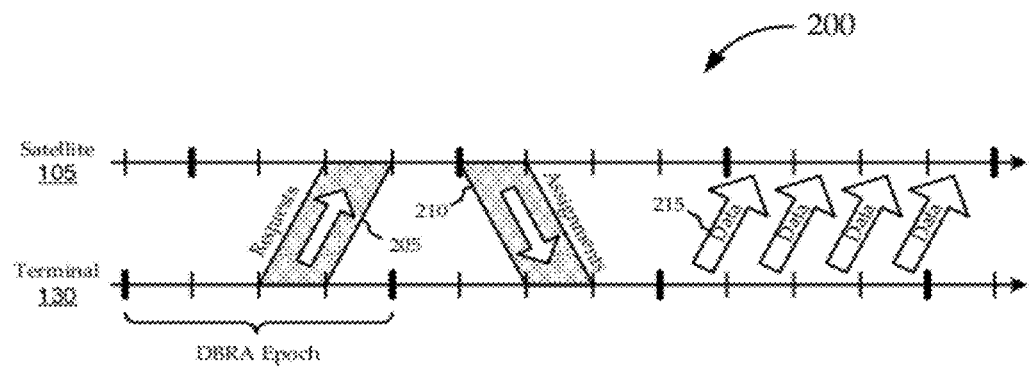
FIG. 2A is a diagram illustrating an example of how terminals may request bandwidth from the satellite, and the satellite may allocate slots, in a system such as the system of FIG. 1.

FIG. 2A is a diagram 200 illustrating an example of how terminals 130 may request bandwidth from the satellite 105, and the satellite 105 may allocate slots, in a system such as the system of FIG. 1. Terminals 130 may transmit requests 205 to the satellite 105. These requests 205 may be based on any combination of past and estimated future bandwidth needs, and may, for example, be sent every epoch, every n epochs, or whenever bandwidth needs change in excess of a threshold. Based on these requests 205, the satellite 105 may allocate system resources (e.g., to particular beams, carriers, traffic classes, etc.). In some embodiments, all the bandwidth resource allocations are made dynamically for each time duration. In other embodiments, the satellite 105 makes certain allocations based on predetermined and/or relatively static allocation schemes (e.g., to beams and carriers), while making other allocations dynamically for each time duration (e.g., to traffic classes). Moreover, the satellite 105 may allocate slot assignments 210 to terminals 130. Terminals 130 may then transmit data 215 on the uplink. These and other types of allocations are described in more detail below.

Figure 2B:
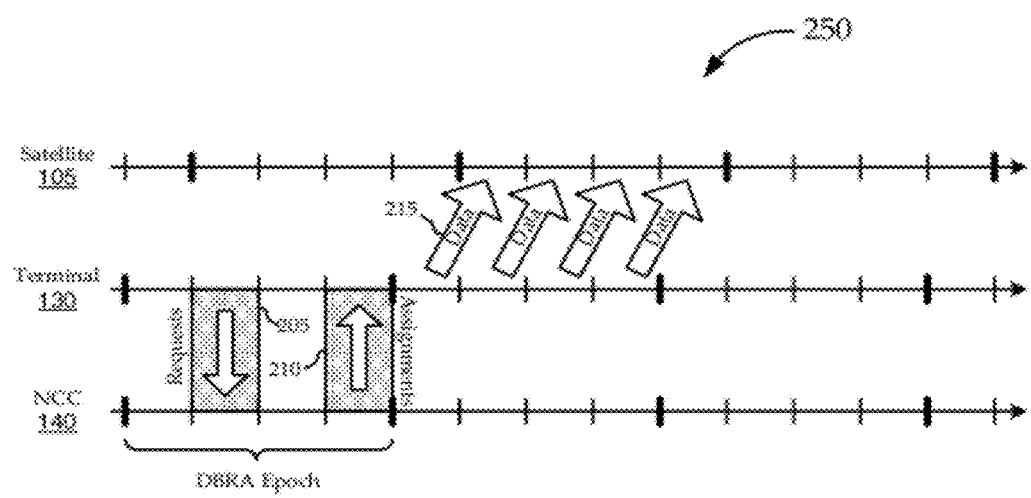
FIG. 2B is a diagram illustrating an example of how terminals may request bandwidth from the NCC, and the NCC may allocate slots, in a system such as the system of FIG. 1.

It is worth noting that while in this embodiment, the satellite 105 performs this allocation and assignments; in other embodiments, all or part of this functionality may be performed by an NCC 140. For example, FIG. 2B is a diagram 250 illustrating an example of how terminals 130 may request bandwidth from the NCC 140, and the NCC 140 may allocate slots, in a system such as the system of FIG. 1. Terminals 130 may transmit requests 205 (e.g., via satellite or other means) to the NCC 140. As with the requests 205 of FIG. 2A, requests 205 may be based on estimated needs and may be sent at various times. Based on these requests 205, the NCC 140 may allocate system resources. Terminals 130 may then transmit data 215 on the uplink to the satellite 105.

FIG. 3 is a diagram that illustrates a table 300 of information that may be sent from a terminal 130 to a satellite 105 (or NCC 140). This may be the information in the bandwidth request message 205 of FIG. 2. All, or any subset, of the following information may be transmitted from a terminal 130 to request bandwidth. For example, a terminal 130 may send a terminal ID 305 (MAC Address, IP Address, other unique identifier or account number for the terminal), a terminal priority 310 (which provides information on the priority of the terminal relative to other terminals), and a mode 315 (which may provide information on a requested modulation scheme, coding, a requested carrier group or amount of bandwidth). A terminal 130 may also transmit specific requests for each of a number of classes 320 of traffic (e.g., voice, interactive data, interactive video, streaming video, or other types of data with different quality of service metrics).

For each traffic class 320 (or for a number of traffic classes), a minimum sustained rate 325 (MinSR), a committed information rate 330 (CIR), and requested information rate 335 (RIR), may also be transmitted. For example, the MinSR 325 for the traffic class 320 may indicate a minimum amount of bandwidth that the system (e.g., the system 100 of FIG. 1) needs to sustain (e.g., for a communication link) to maintain efficacy of the communications. For example, certain system components and/or types of traffic may require a certain minimum bandwidth to operate properly, which may be factored into determining the MinSR 325. The CIR 330 for the traffic class 320 may indicate an amount of bandwidth committed to by a service provider (e.g., by a service level agreement). For example, a user may contract with a service provider to receive a certain committed amount of bandwidth on the communication link between the user's terminal 130 and the satellite 105. The RIR 335 for the traffic class 320 may indicate an amount of bandwidth being requested by a terminal 130 (e.g., for a particular time duration). For example, while a service provider may have a contractual agreement to commit a certain amount of bandwidth to a terminal 130, the terminal 130 may actually request more or less bandwidth at any point in time. There may also be sub-types of traffic within a traffic class 320.

It will be appreciated that satisfaction of terminal requests may depend on a number of factors and may not proceed in all cases according to the number of resource units requested, specific resource obligation quantities, etc. For example, insufficient resources may be available to satisfy all requests from all terminals 130 (e.g., where the links are oversubscribed. Further, allocated amounts may differ from requested amounts as a function of the allocation techniques used.

It is worth noting, moreover, that the bandwidth requests may instead be forwarded via the satellite 105 to one or more ground terminals 130 (e.g., as shown with transmission to the NCC 140 in FIG. 2B). The satellite 105, the NCC 140, or any combination thereof may perform the system allocation and time slot assignment functionality. It is also worth noting that the bandwidth request data may be made up of specific MinSR 325, CIR 330, and RIR 335 data, or may be in different forms. For example, the bandwidth request messages may instead reflect past data traffic in one or more of the categories. In different embodiments, there may be other formulations reflecting various quality of service or traffic class metrics, and include various types of past traffic or estimated future traffic information.

Figure 4:
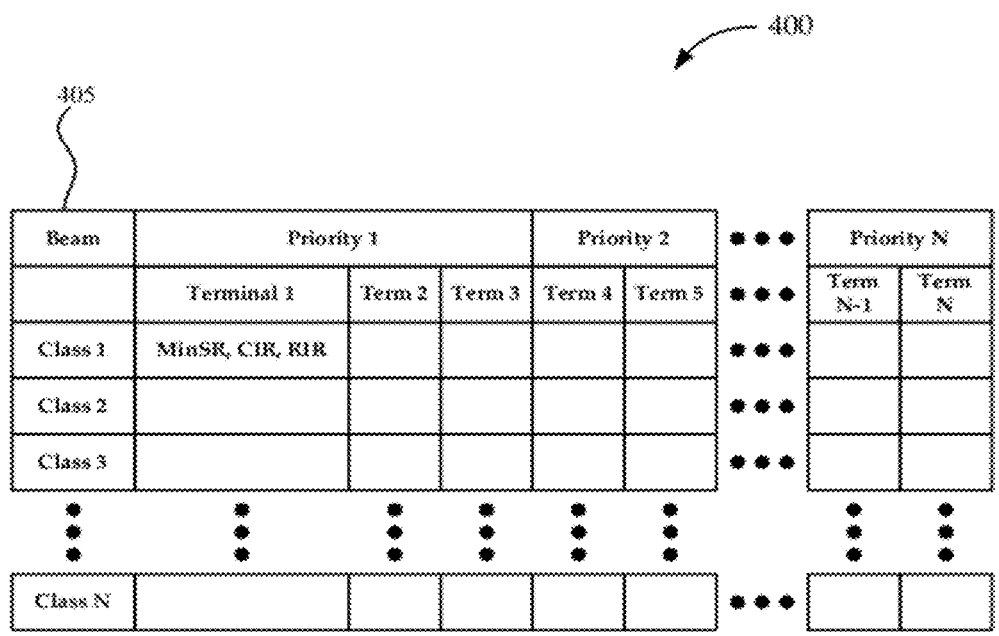
FIG. 4, a diagram is shown that illustrates part of a table of information that may be stored on the satellite.

Turning next to FIG. 4, a diagram is shown that illustrates part of a table 400 of information that may be stored on the satellite 105. This table may be based, for example, on the information sent in bandwidth requests 205 from a terminal 130 to a satellite 105 (or NCC 140) as illustrated by FIGS. 2A, 2B, and 3. In one embodiment, the bandwidth requests from the terminals 130 are collected into a table. The MinSR, CIR, and RIR for each terminal 130 are identified in groups according to terminal priority (e.g., from highest priority to lowest priority). In one embodiment, the MinSR, CIR, and RIR are further divided for each traffic class. The MinSR, CIR, and RIR values may be specified in various types of resource units. For example, the values may be specified in bits/second, Kbits/second, or other metric; they may also be converted to a measure of normalized time-slots/epoch. The conversion may be of the terminal mode (e.g., channel size, modulation, and coding). Those skilled in the art will recognize the various ways in which the MinSR, CIR, RIR values bit rates may be normalized into time slots to ease calculations. There may be a number of different ways in which tables may be stored to reflect bandwidth requests 205 sent from the terminals 130.

Figure 5:
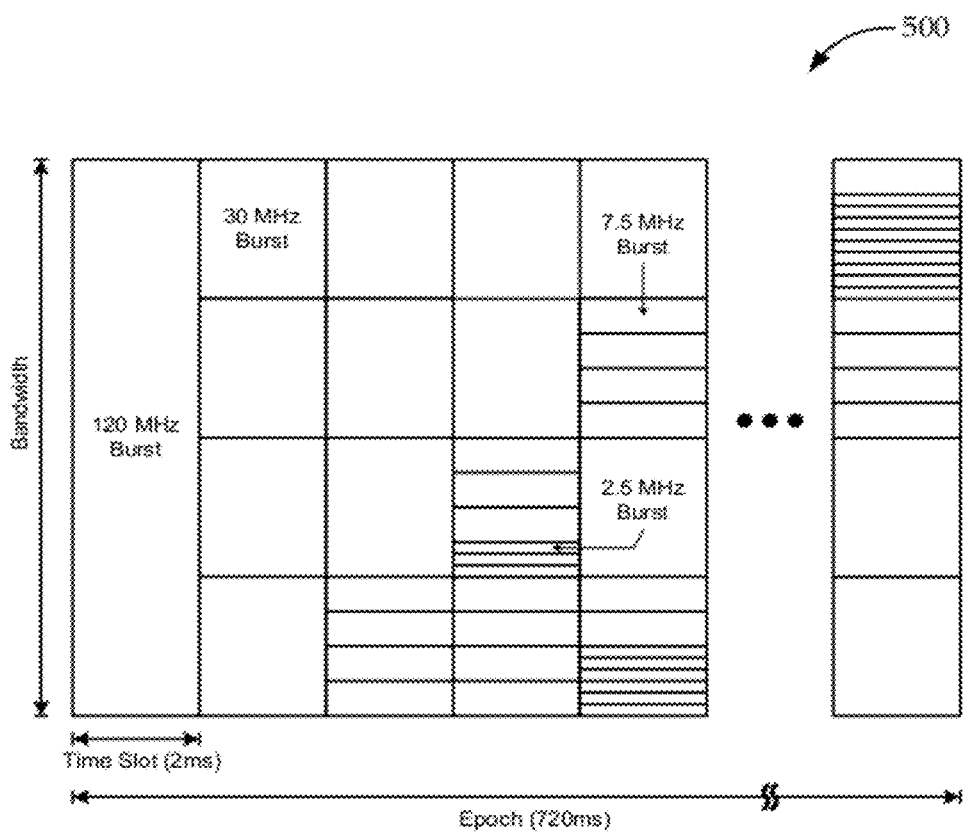
FIG. 5 is a diagram illustrating how a channel may be structured for allocating multiple bands in a satellite communications system.

As noted above, there may be n bands (channels) to be allocated to a satellite 105. FIG. 5 is a diagram 500 illustrating how one such channel may be structured. In this embodiment, there is a 120 MHz channel, and portions of this channel may be allocated to terminals in each epoch (in this embodiment, 720 ms). A channel may be divided up into sub-channels (which may be referred to as carrier groups); in the illustrated embodiment, it may be 120 MHz, 30 MHz, 7.5 MHz, and 2.5 MHz; in other embodiments, there may be different channel or sub-channel sizes. Each epoch may be split into different time slices, or bursts; in one embodiment, the time slices are 2 ms each. For a given system, the satellite 105 may be allocated a limited amount of bandwidth, and thus particular allocated channels (or time slots therein), and the time slots within channels may be allocated to terminals.

A determination may initially be made regarding the total amount of bandwidth that is available to be allocated. There may be any number of ways to identify a total amount of capacity that is to be allocated over a period of time. The total capacity may be limited by the frequency spectrum available for use on the uplink and/or downlink, or the demodulators on the satellite, or a number of other factors. There may be a margin used in identifying the bandwidth available, as well. The bandwidth allocation may be performed dynamically, or may be static, and may be performed by the NCC 140 or DBRA control unit 125 of FIG. 1. There may be an uplink allocation, and a downlink allocation.

In some embodiments, additional information is used to adjust (e.g., dynamically) the allocations to the terminals 130. In one embodiment, one or more communication modes may be selected or detected. For example, based on a detected link condition between the satellite 105 and one or more terminals 130, a modcode (e.g., a modulation and/or coding scheme) may be selected. The modcode may dictate certain characteristics of the communication, such as the amount of error coding and other overhead in each communicated physical layer frame. As such, the amount of available system resources and/or the amount of resource units allocated to terminals 130 may have to be adjusted to account for the overhead dictated by the modcode.

To initiate the process wherein slots for carrier groups may be assigned to terminals 130, assume that bandwidth has been allocated to the satellite 105 for beam 150 (on either the uplink or downlink) of FIG. 1, and that a particular region or regions of spectrum (referred to above as channels) have been assigned. Within this spectrum, there are a number of different carrier group sizes (e.g., in one embodiment, there are four carrier group sizes: 120 MHz, 30 MHz, 7.5 MHz, and 2.5 MHz; in another, there are three sizes: 100 MHz, 25 MHz, and 5 MHz). A determination may be made apportioning the allocated bandwidth among different carrier group sizes, identifying the total number of each carrier group size for the allocated bandwidth (e.g., across n epochs). In one embodiment, the total amount of bandwidth may consist of a specified number of time slots for each of the carrier groups.

Figure 6:
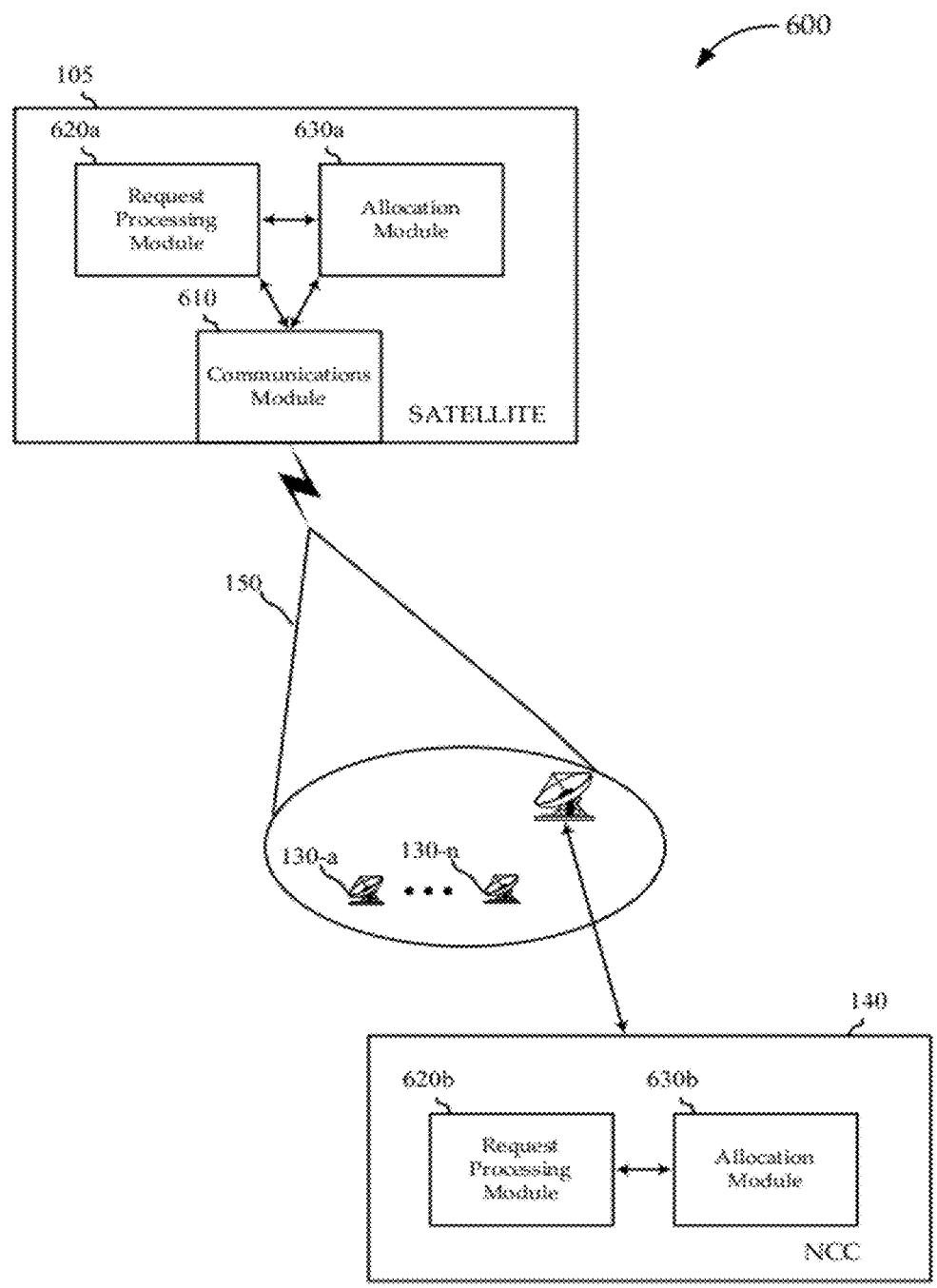
FIG. 6 shows an embodiment of a satellite communications system for apportioning resource units according to various embodiments.

As discussed above, apportionments of resources may be performed by one or more components of a satellite and/or NCC (e.g., the satellite 105 or NCC 140 of FIG. 1). FIG. 6 shows an embodiment of a satellite communications system 600 for apportioning resource units according to various embodiments. The system 600 includes a satellite 105 in communication with terminals 130 (e.g., subscriber terminals or gateways), and an NCC 140. The satellite 105 in the illustrated embodiment includes a single beam 150 for a particular coverage area (note that in other embodiments, there may be a more than one beam.

Embodiments of the satellite 105 include various functional blocks, like a communications module 610, a request processing module 620a, and an allocation module 630a. Similarly, embodiments of the NCC 140 include various functional blocks, like a request processing module 620b and an allocation module 630b. The communications module 610 implements various communications functions, such as decoding physical layer frames, modulating and demodulating, etc. For example, in certain embodiments, the communications module 610 implements functionality of the U/D converter(s) 110, the modem unit(s) 115, and the routing unit 155 of the satellite 105 of FIG. 1. Though not shown, embodiments of the NCC 140 may also include components for handling certain types of communications functions. For example, components of the NCC 140 may handle terrestrial network communications with one or more terminals 130 (in addition to, or instead of, communication via satellite).

The request processing module(s) 620 may implement functionality, including receiving, interpreting, and/or estimating resource requests from terminals 130. For example, terminals 130 may communicate resource requests to the satellite 105 (e.g., as in FIG. 2A). The satellite 105 receives the requests at the communications module 610, which processes the communication to extract (e.g., parse, demodulate, error correct, etc.) the request data. The request data is then processed by the request processing module 620a in the satellite 105. For example, request data from many terminals 130 in the beam 150 are processed by the request processing module 620 to develop a full picture of the total resource requests for a particular time duration (e.g., epoch).

The requests are then passed to the allocation module 630a in the satellite 105 or the allocation module 630b in the NCC 140 to determine appropriate allocations to fulfill the requests. In some embodiments, the request processing module(s) 620 and the allocation module(s) 630 work together to apportion bandwidth resources in one or more different ways, for example, as described with reference to the DBRA control unit 125 of FIG. 1. Various types of apportionments of resources are described in more detail below. In particular, FIGS. 7-10 describe embodiments of apportionments relating to class pool sizing, FIGS. 11 and 12 describe embodiments of apportionments relating to terminal assignments, and FIGS. 13 and 14 describe embodiments of apportionments relating to resource sharing policies. Each of these types of apportionment will be discussed with reference to the system 600 of FIG. 6. However, it will be appreciated that the specific system components and flow diagram blocks are intended only to provide illustrative embodiments and should not be construed as limiting the scope of the invention.

Class Pool Sizing

As discussed above, many types of bandwidth resource allocations are possible according to various embodiments. In some embodiments, allocations are made according to traffic class designations associated with requests received from terminals 130 at the satellite 105 or the NCC 140. For example, the system 600 may be configured to allocate bandwidth resources according to each carrier group (CG) allocation, whereby each of a number of carrier groups is apportioned resource units (e.g., time slots). Embodiments may re-apportion each of the CG allocations among particular traffic class designations. In various embodiments, the traffic class allocations may be determined for particular time durations (e.g., dynamically for each epoch), for example, as a function of received or predicted bandwidth requests from terminals 130 for that time duration. This re-apportionment may, for example, be performed by the NCC 140 or satellite 105 of FIG. 6, or any combination thereof.

Figure 7A:
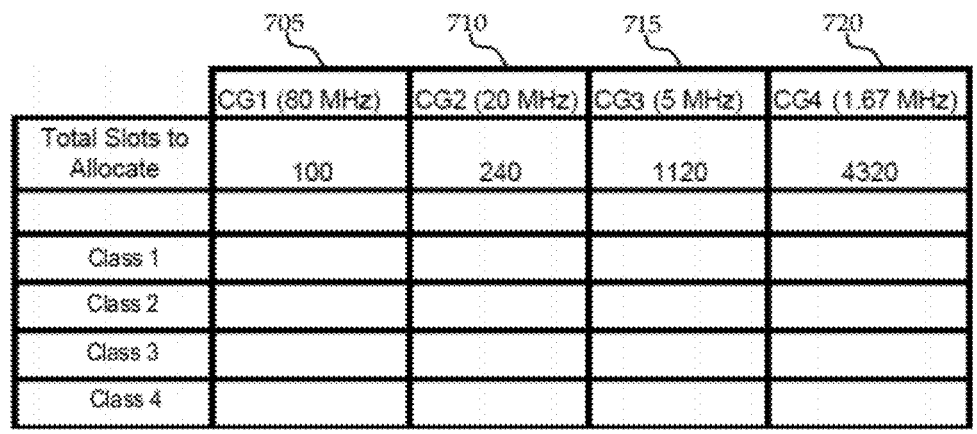
FIG. 7A shows a table illustrating an example carrier group allocation.

Turning first to FIG. 7A, a table 700 illustrates an example CG allocation. The table 700 shows the apportionment for Carrier Group 1 (80 MHz) 705, Carrier Group 2 (20 MHz) 710, Carrier Group 3 (5 MHz) 715, and Carrier Group 4 (1.67 MHz) 720. In other embodiments, the carrier groups may be of different sizes (e.g., as shown in FIG. 5), and apportionments may be static or dynamic. Some embodiments receive the CG allocation from a separate system or method (i.e., the CG allocation is generated separately). For example, the CG allocation of FIG. 7A may represent a baseline condition for embodiments of traffic class allocations.

Notably, in each epoch (or, across n epochs), a carrier group apportionment for the satellite 105 may be re-apportioned among traffic classes. However, instead of a per-epoch re-apportionment, in some embodiments the re-apportionment may occur more or less often. The re-apportionment may be made for each carrier group individually; for example, re-apportion Carrier Group 1 705 for the epoch, then re-apportion Carrier Group 2 710, then re-apportion Carrier Group 3 715, and then re-apportion Carrier Group 4 720.

Figure 7B:
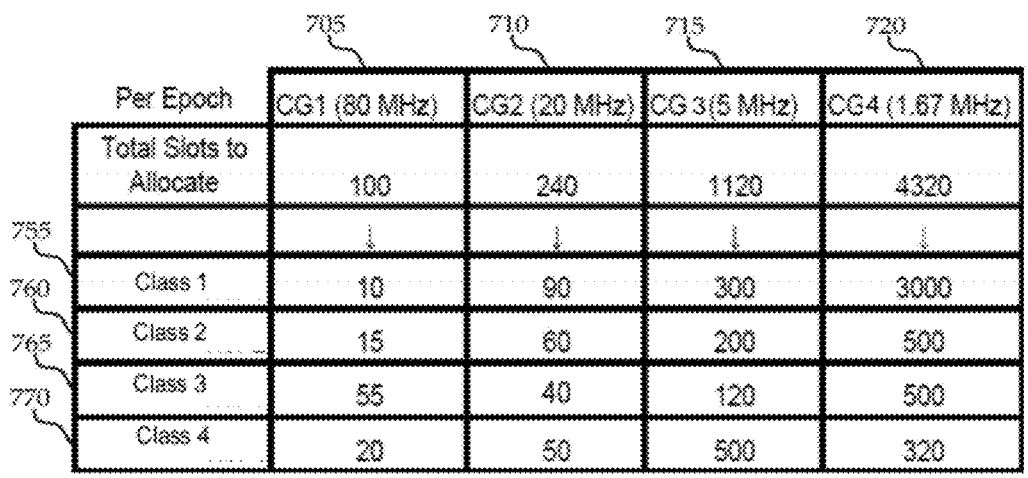
FIG. 7B shows a table illustrating an example re-apportionment of each carrier group among traffic classes.

FIG. 7B is a table 750 illustrating an example re-apportionment of each carrier group among traffic classes. In one embodiment, Carrier Group 1 705 is first re-apportioned to traffic class 1 755, then class 2 760, then class 3 765, and finally class 4 770; Carrier Group 2 710 is next re-apportioned to class 1 755, then class 2 760, then class 3 765, and finally class 4 770; Carrier Group 3 715 is then re-apportioned to class 1 755, then class 2 760, then class 3 765, and finally class 4 770; concluding with Carrier Group 4 720 being re-apportioned to class 1 755, then class 2 760, then class 3 765, and finally class 4 770. There may be different numbers of traffic classes in other embodiments. It is worth noting that, while the table 750 shows a typical scenario in which traffic class allocations in each carrier group sum to their respective CG allocation, this may not always be the case. For example, it may be desirable in certain cases to redistribute bandwidth resources among carrier groups, under-allocate resources within a carrier group allocation, etc. Further, the apportionments shown in FIG. 7B represent only one of many possible apportionments relating to traffic classes. Further traffic class apportionments may be implemented in a number of different ways according to various embodiments.

Figure 8:
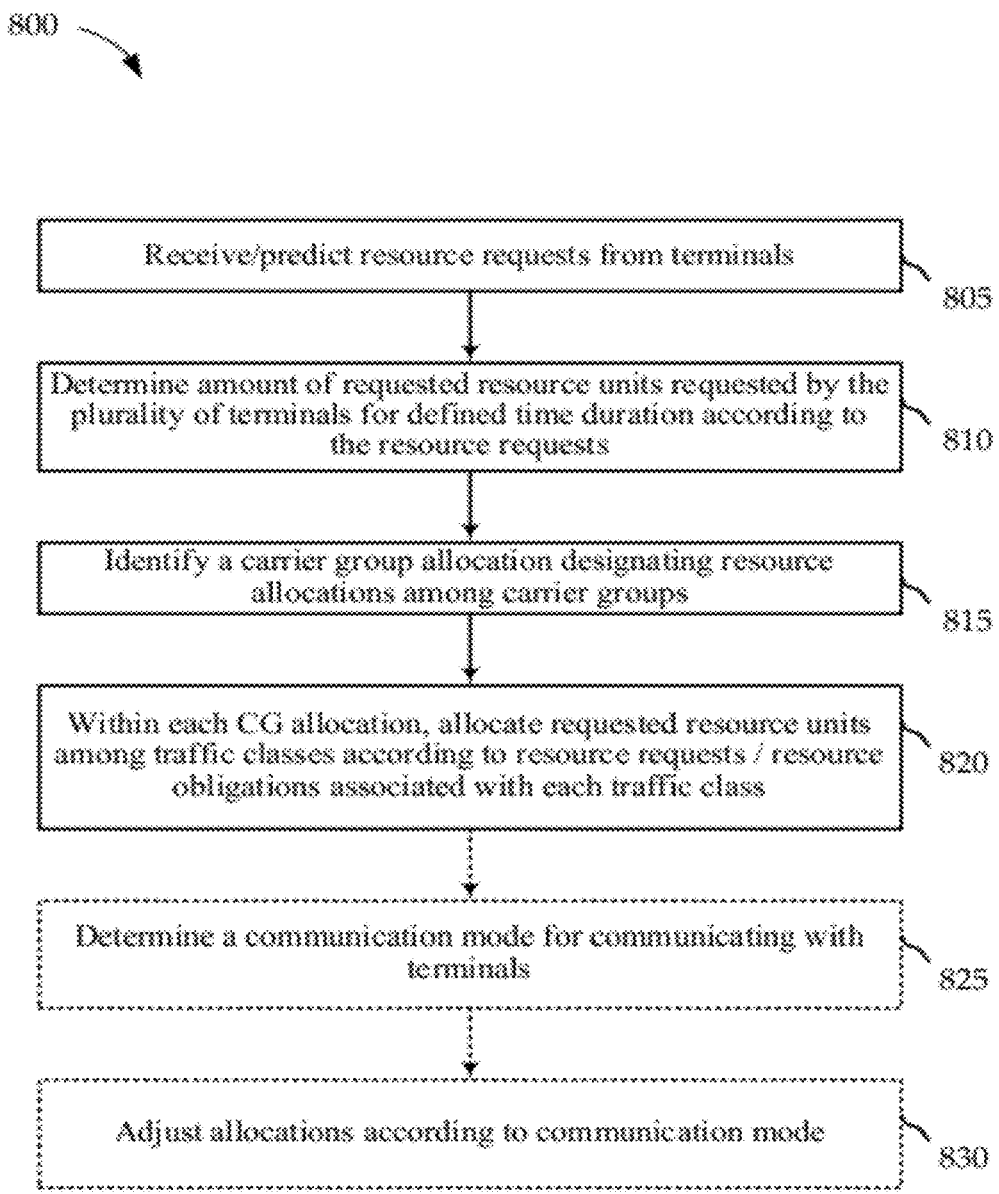
FIG. 8 shows a flow diagram illustrating embodiments of a method for implementing resource apportionments for traffic classes.

FIG. 8 shows a flow diagram illustrating embodiments of a method 800 for implementing resource apportionments for traffic classes. The method 800 begins at block 805 by receiving resource requests from terminals in a satellite communications system (e.g., the system 600 of FIG. 6). As discussed above, the requests may be received at one or more satellites and/or NCCs from one or more terminals (e.g., over one or more beams). In some embodiments, the resource requests are partially or completely predicted, for example, based on communication trends, past requests, etc. The resource requests may be characterized in terms of resource units, each resource unit designating a type of system or satellite resource. For example, resource units may relate to time slices (e.g., portions of an epoch), bandwidth amounts (e.g., portions of available frequency bands), etc.

At block 810, an amount of requested resource units is determined according to the resource requests. In one embodiment, resource requests are received for a given time duration (e.g., n epochs, one epoch, or a portion of an epoch) from all the terminals. The resource requests are accumulated and may be used to determine the total number of per-class resource units requested by the terminals. In another embodiment, resource requests are received from some terminals (e.g., representative terminals of a certain priority, as described more fully below) and used to extrapolate a total number of resource units being requested by all the terminals.

A carrier group (CG) allocation may then be identified at block 815, which may indicate a certain allocation of resources among the various carrier groups. As discussed above, the CG allocation may be relatively static (e.g., over multiple epochs), or may change according to certain factors. At block 820, the resource units in each CG allocation are further allocated among traffic classes. In various embodiments, the traffic class allocations are made in block 820 according to one or more factors. In some embodiments, traffic class allocations are made according to the amount of resource units requested per-class for the time duration, as determined in block 810. In other embodiments, traffic class allocations are made according to one or more types of resource obligations associated with each traffic class. In some embodiments, resource obligations are designated in terms of minSR, CIR, and RIR designations. For example, each traffic class within each carrier may have an associated MinSR, CIR, and RIR. The resource obligations may be static or dynamic. In certain embodiments, the resource obligations are designated as part of the resource requests. For example, as shown in FIG. 3, the resource request sent by the terminal includes information on resource obligations (e.g., columns 325, 330, and 335) associated with each traffic class (e.g., column 320).

Figure 9:
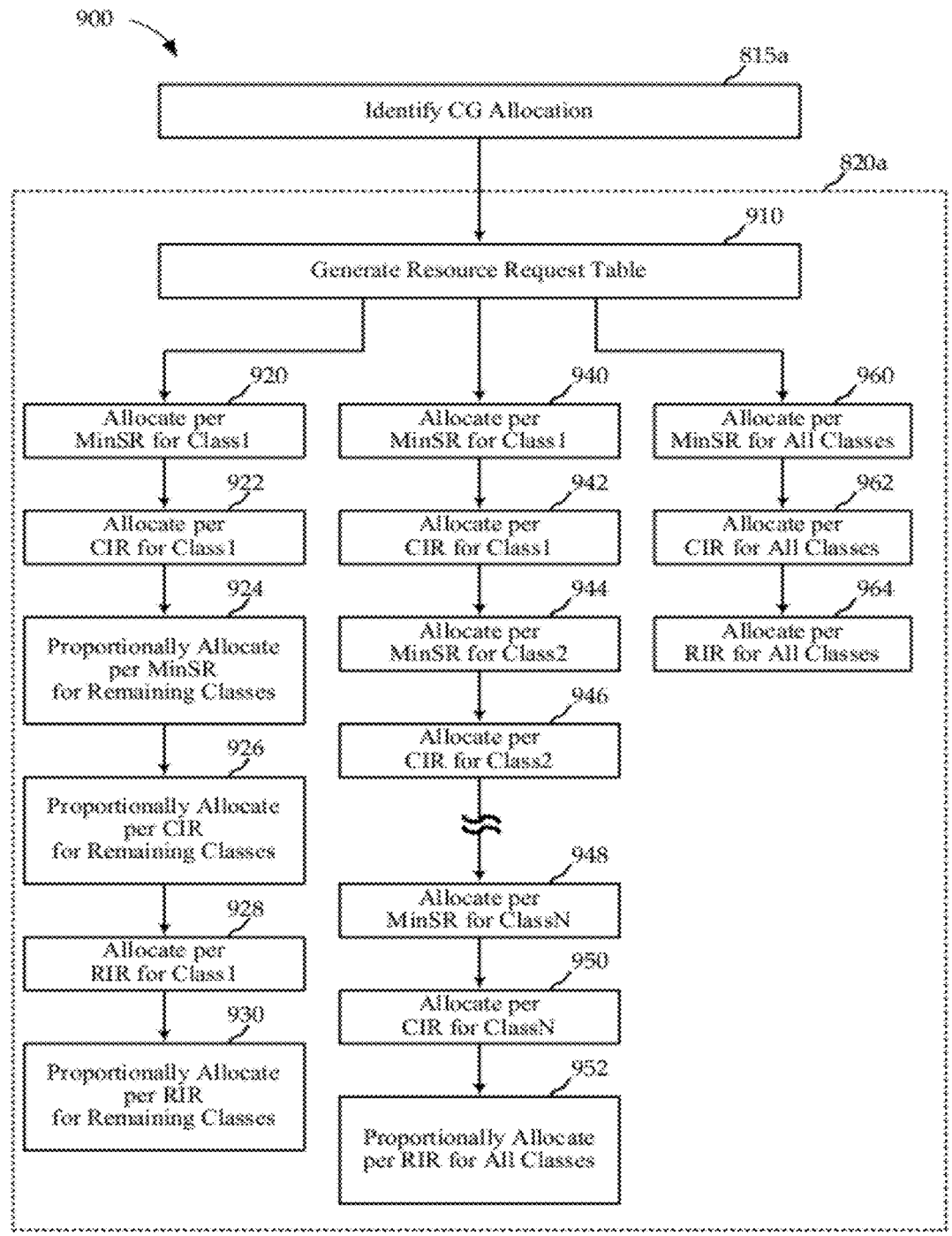
FIG. 9 shows another flow diagram illustrating embodiments of a method for making traffic class allocations.

Embodiments of methods for making traffic class allocations are illustrated by the flow diagram of FIG. 9. The method 900 of FIG. 9 begins at block 815a, in which a CG allocation is identified. The identification in block 815a may be similar to that of block 815 in FIG. 8. As illustrated, the remainder of the method 900 shows some of the various options for implementing the traffic class allocations, as in block 820 of FIG. 8. The portion of the method 900 may begin at block 910 by generating a resource request table. As discussed above, the resource request table may be determined based on received and/or predicted resource requests (e.g., and adjusted based on other factors, as described below). For example, one embodiment of the resource request table may effectively be a three-dimensional dataset represented as a two-dimensional record (e.g., the dataset of FIG. 3) associated with each of the terminals. Another embodiment of the resource request table may look similar to the table shown in FIG. 4.

Once the method 900 determines what resources are available for allocation, the resources are further allocated in one or more ways according to the resource obligations per traffic class. Thus, there may be different predetermined resource obligation prioritization schemes defining a priority relationship between the set of resource obligations. Similarly, there may be different predetermined traffic class prioritization schemes. These various schemes may be integrated. In one embodiment, allocations are made for traffic class 1 according to its MinSR resource obligation in block 920, and then according to its CIR resource obligation in block 922. Remaining resources, if any, may be allocated proportionally among the other traffic classes according to their collective MinSR resource obligations in block 924, then according to their collective CIR resource obligations in block 926. Remaining resources, if any, may then be allocated for traffic class 1 according to its RIR resource obligation in block 928, and proportionally among the other traffic classes according to their collective RIR resource obligations in block 930.

In another prioritization scheme, allocations are made for traffic class 1 according to its MinSR resource obligation in block 940, and then according to its CIR resource obligation in block 942. Remaining resources, if any, may be allocated for traffic class 2 according to its MinSR resource obligation in block 944, and then according to its CIR resource obligation in block 946. This type of allocation may continue until remaining resources, if any, are allocated for traffic class N according to its MinSR resource obligation in block 948, and then according to its CIR resource obligation in block 950. Remaining resources, if any, may then be allocated proportionally among all the traffic classes according to their collective RIR resource obligations in block 952.

In yet another prioritization scheme, allocations are made among all the traffic classes according to their collective MinSR resource obligations in block 960. Remaining resources, if any, may then be allocated among all the traffic classes according to their collective CIR resource obligations in block 962. Remaining resources, if any, may then be allocated among all the traffic classes according to their collective RIR resource obligations in block 964. Of course, many other types of traffic class apportionments are possible within the CG apportionments.

Returning to FIG. 8, in some embodiments, the allocations are adjusted according to other factors. Embodiments of the method 800 continue with block 825, in which one or more communication modes are determined for communicating with one or more terminals. For example, a link condition may be monitored and used to determine various communication parameters (e.g., bit error rate, etc.). The communication mode may be adjusted dynamically to account for changes in the link condition. For example, adaptive coding and modulation (ACM) may be used to dynamically adjust a modcode for transmitting information to terminals. Alternatively, as shown in FIG. 3, the request from the terminal may include communication mode information (e.g., column 315), such as burst size, modulation scheme, coding scheme, etc. It will be appreciated that changes in communication mode may impact available allocatable resources. For example, different communication modes may involve different burst sizes, different amounts of overhead, etc. As such, resource unit allocations may have to account for the communication mode. In some embodiments, at block 830, the allocations are adjusted as necessary or desired to account for changes in the communication mode. In certain embodiments, the communication mode is used to adjust the available amount of allocatable resources prior to making CG allocations at block 815 and/or traffic class allocations at block 820. In other embodiments, the communication mode may be selected and factored in before the per-class allocations occur.

Figure 10:
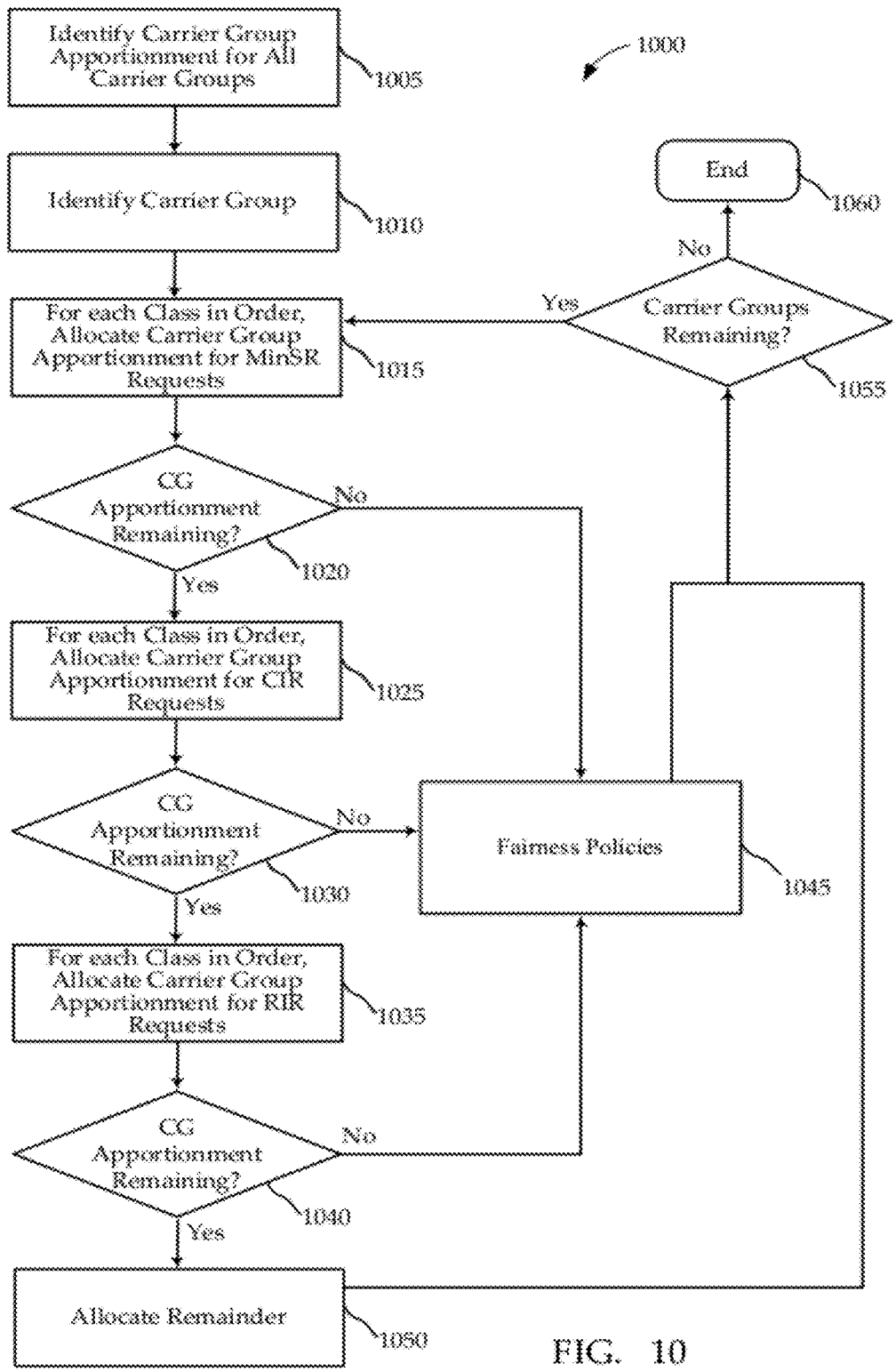
FIG. 10 is a flowchart illustrating one embodiment of a carrier group re-apportionment among traffic classes.

In various embodiments, multiple types of traffic class apportionment are used (e.g., like those shown in FIG. 9), and other types of resource sharing policies (e.g., fairness policies) are integrated into the allocation process. FIG. 10 is a flowchart illustrating a method 1000 of carrier group re-apportionment among traffic classes.

At block 1005, the apportionment of carrier groups for an epoch is identified. For each carrier group, the following re-apportionment may occur (e.g., each epoch). At block 1010, a first carrier group is identified. At block 1015, the MinSR request over an epoch at the identified carrier group is allocated to traffic classes. Thus, in one embodiment, assume that there are 3 traffic classes (1 being the highest priority). Thus, the requested MinSR bandwidth for class 1 traffic may be allocated carrier group assignments. If some of the CG apportionment remains, the requested MinSR bandwidth for class 2 traffic may be allocated carrier group assignments. If CG apportionment remains, requested MinSR bandwidth for class 3 traffic may be allocated carrier group assignments. If, as indicated at block 1020, a determination is made during any of these allocations that there is an insufficient CG apportionment to allocate to MinSR requests at that class level, the MinSR for that class level may be apportioned according to fairness policies 1045 (e.g., Proportional, Weighted Proportional, Fair Share, Weighted Fair Share, etc., as discussed in more detail below).

If some of the CG apportionment remains available after all MinSR allocations are made, at block 1025, the CIR requests over the epoch for the identified carrier group are allocated to traffic classes. It will be appreciated that the CIR allocation may be determined in a number of different ways. In some embodiments, the CIR request is actually the CIR request less the previously allocated MinSR. For example, if the agreed MinSR is 10 units and the agreed CIR is 100 units, the actual CIR allocation may represent only the 90 units remaining to fulfill the agreed CIR units of bandwidth. In other embodiments, the CIR request value may equal min(CIR, RIR). For example, the agreed MinSR is 10 units, the agreed CIR is 100 units, and the requested RIR is 80 units. Because the terminal (e.g., or terminal class) is only requesting an RIR of 80 units for the epoch, it may be inefficient to allocate more than the amount requested, and the actual CIR allocation may represent only the 70 units remaining to fulfill the requested RIR units of bandwidth.

Thus, in block 1025, the requested CIR bandwidth for class 1 traffic may be allocated carrier group assignments. If some of the CG apportionment remains, the requested CIR bandwidth for class 2 traffic may be allocated carrier group assignments. If CG apportionment remains, requested CIR bandwidth for class 3 traffic may be allocated carrier group assignments. If, as indicated at block 1030, a determination is made during any of these allocations that there is an insufficient CG apportionment to allocate to CIR requests at that class level, the CIR for that class level may be apportioned according to fairness policies 1045. Note that the CIR requests may be done first, instead of the MinSR requests, in some embodiments.

If some of the CG apportionment remains available, the RIR request over the epoch for the identified carrier group is allocated to traffic classes at block 1035. An RIR request may be the RIR request less the previously allocated CIR and MinSR. For example, if the agreed MinSR is 10 units, the agreed CIR is 100 units, and the requested RIR is 140 units, the maximum actual RIR allocation may represent only the 40 units remaining to fulfill the requested RIR units of bandwidth. Thus, the requested RIR bandwidth for class 1 traffic may be allocated carrier group assignments. If some of the CG apportionment remains, the requested RIR bandwidth for class 2 traffic may be allocated carrier group assignments. If CG apportionment remains, requested RIR bandwidth for class 3 traffic may be allocated carrier group assignments. If, as indicated at block 1040, a determination is made during any of these allocations that there is an insufficient CG apportionment to allocate to RIR requests at that class level, the RIR for that class level may be apportioned according to fairness policies 1045.

In some embodiments, if it is determined that the CG apportionment remains available at block 1040, the remaining CG apportionment may be apportioned between classes at block 1050 (e.g., on a round robin basis). Once an identified carrier apportionment has been allocated to classes, a determination may be made whether there is another carrier group apportionment to allocate to classes at block 1055. If so, the method 1000 may resume from block 1010 for a new carrier group; if not, the process may be terminated 1060 for the epoch.

Thus, there may be a dynamic re-apportionment of given carrier groups slots across classes in each epoch. This re-apportionment may be adaptive to changing traffic demands, mobile terminals moving in and out of the beam, and weather issues (which may require more bandwidth to transmit the same amount of data). The re-apportionment may be responsive to requests from terminals and account for terminal priority and the characteristics of the traffic. While the re-apportionment is discussed as occurring over every epoch, it may also occur more or less regularly. It is worth noting that there may be more, or fewer, traffic classes and terminal priority levels. Certain priority levels may have different priority attributes as well. It is also worth noting that the MinSR, CIR, and RIR are merely examples, and these traffic request categorizations (e.g., resource obligations) may be expanded, narrowed, or otherwise refined.

The following pseudocode represents an example embodiment of the carrier group re-apportionment among traffic classes:

```
Input -
    S - Number of slots in Carrier Group
    MinSR[term, class] -            MinSR for each terminal and class, in slots
    CIR[term, class, level] -       CIR for each terminal, class and level, in slots
                                    CIR[level*] values are cumulative, with CIR[maxLevel-1] = 100%
    RIR[term, class] - Requested slots for each terminal and class
Output -
    S[class*] - Number of slots allocated to each class
Algorithm -
    S[class*] = 0
    -- Allocate MinSR
    For each priority level p from high to low
        MinSRClass[class] = Sum(MinSR[term, class], for all terminals at priority p in
    CG)
        if Sum(MinSRClass[class], for all classss) >= S then
            -- Insufficient resources to meet MinSR, use policy to allocate
            S[class*] = DBRAShare(S, MinSRClass[class*], PolicyCIRClass)
            done
        else
            -- Allocate MinSR
            S[class] += MinSRClass[class] for each classs
            S = S - allocations made in previous step
        endif
    endfor
    -- Allocate GIR (request below CIR)
    For L = 0 to numCIRLevels
        For each priority level p from high to low
            GIR[term, class, L] = max(min(RIR[term, class], CIR[term, class, L], 0) -
                                    CIR[term, class, L-1], 0)
            -- CIR[term, class, -1]= minSR[term, class]
            GIRClass[class, L] = sum(GIR[term, class, L], all terminals at priority p)
            if Sum(GIRClass[class, L], class) >= S then
                -- Insufficient resources to meet GIR, use policy to allocate
                S[class*] += DBRAShare(S, GIRClass[class*, L], PolicyCIRClass)
                done
            else
                -- Allocate GIR
                S[class] += GIRClass[class, L] for each class
                S = S - allocations made in previous step
            endif
        Endfor
    Endfor
    -- Allocate EIR (request above CIR)
    EIR[term, class] = max(RIR[term, class] - CIR[term, class, maxLevel - 1], 0)
    EIRClass[class] = Sum(EIR[term, class], all terminals)
    if Sum(EIRClass[class], class) >= S then
        -- Insufficient resources to meet EIR, use policy to allocate
        S[class*] += DBRAShare(S, EIRClass[class*], PolicyEIRClass)
        done
    else
        -- Allocate EIR
        S[class] += EIRClass[class] for each class
        S = S - allocations made in previous step
    endif
    -- Allocate Extra
    RIRClass[class*] = Sum(RIR[term, class], all terminals)
    S[class*] += DBRAExtraShare(S, RIRClass[class*])
    Allocate leftover slots, if any, in round-robin order to classes.
```

Terminal Assignment

There are a number of different ways in which terminals may be assigned to particular carrier group and/or traffic class allocations. In some embodiments, the terminal assignment for a carrier group (CG) allocation or traffic class allocation may take place concurrently, before, or after the slot placement (e.g., before, in parallel, or after the time slot and frequency for the carrier group allocation is associated with a terminal). Further, in various embodiments, the CG allocation may be re-allocated according to traffic class, as discussed above, prior to assigning bandwidth units (e.g., time slots) to the terminals.

Figure 11:
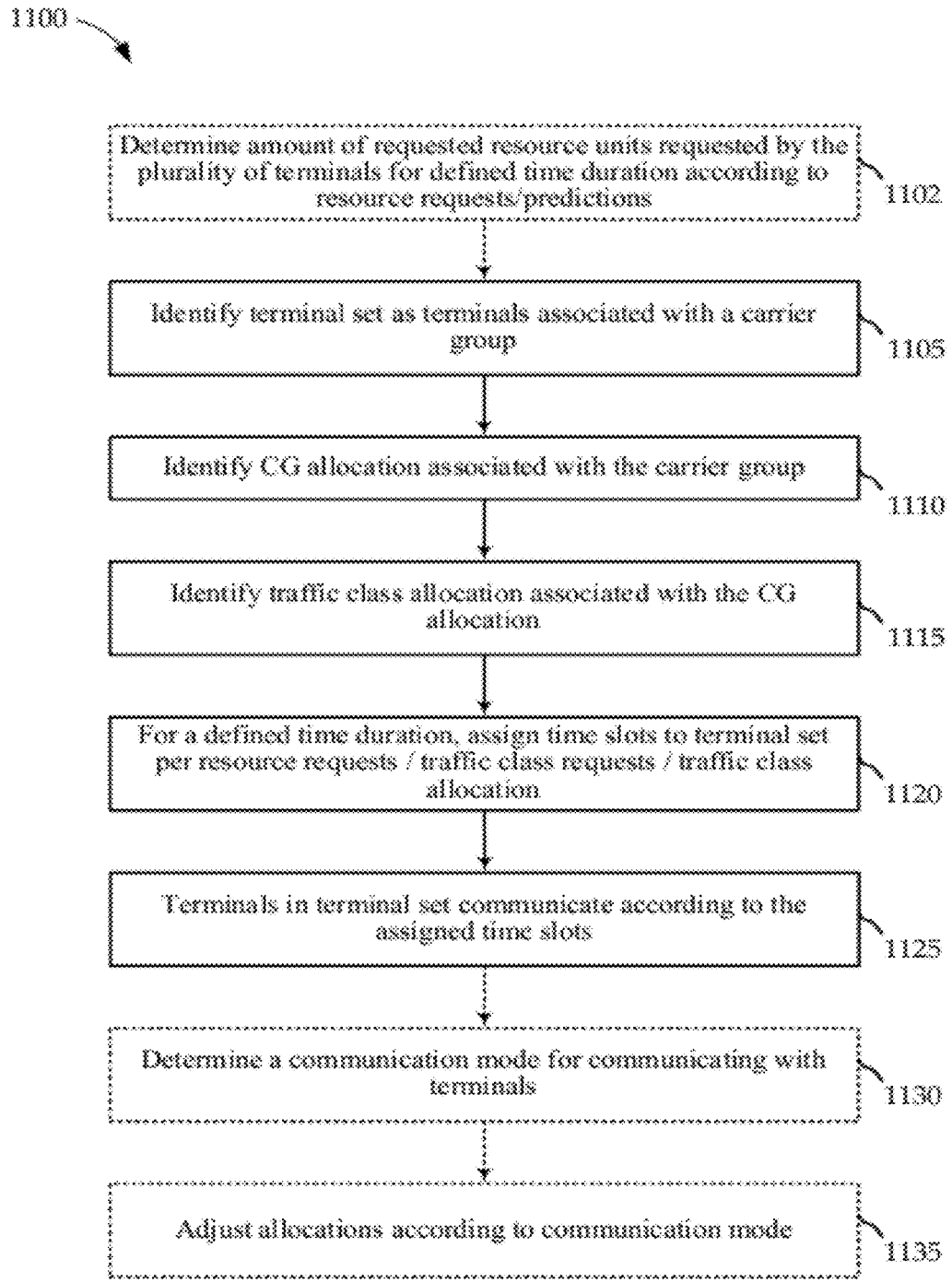
FIG. 11 is a flowchart illustrating a method for assigning bandwidth resources to terminals, according to various embodiments.

FIG. 11 is a flowchart illustrating a method 1100 for assigning bandwidth resources to terminals (e.g., the terminals 130 of FIG. 1), according to various embodiments. Embodiments of the method 1100 begin at block 1105 by identifying a terminal set having the portion of terminals in a satellite communications system associated with a particular carrier group. At block 1110, a resource unit allocation for the particular carrier group is identified.

Once the CG allocation is identified in block 1110, a traffic class allocation associated with the CG allocation is identified at block 1115. In some embodiments, the traffic class allocation identified in block 1115 may have been implemented according to embodiments described above with reference to FIGS. 7-10. For example, the traffic class allocation may be associated with a particular resource requests. As such, certain embodiments of the method 1100 include block 1102, in which an amount of requested resource units requested by the terminals for defined time duration is determined. For example, requested resource units are determined according to predictions or received requests associated with terminals in the terminal set for an epoch.

The CG allocation identified in block 1110 and the traffic class allocation identified in block 1115 are shown in the method 1100 as effectively setting a baseline allocation for use in assigning the resources to the terminals. However, it is worth noting that other types of baseline allocations are possible according to other embodiments. For example, a traffic class allocation may be made without identifying a CG allocation or vise versa.

At block 1120, resource units (e.g., time slots) are assigned to particular terminals in the terminal set according to one or more factors. The assignments may be made for the defined time duration (e.g., the epoch associated with resource requests or predictions in block 1102), for another time duration (e.g., for an adjacent epoch), or for a shorter or longer time duration (e.g., for a portion of an epoch or across multiple epochs). In some embodiments, the terminal assignments are made according to terminal resource requests (e.g., as received in block 1102). For example, time slots may be assigned to a particular terminal in an attempt to most efficiently satisfy and prioritize resource requests in the context of resource requests from other terminals and/or other resource needs of the system. In some embodiments, the terminal assignments are made by associating per-class requests with the traffic class allocations identified in block 1115. For example, the terminals of a given carrier group may be assigned time slots for each traffic class allocation according to the MinSR, CIR, and RIR requests of those terminals for each respective class. The assignment of time slots may be specific (e.g., a specific time slot on a particular carrier); alternatively, the assignment may be generic (e.g., simply one of the time slots for an epoch, without assignment of the particular time slot within the epoch or the specific frequency or size of the carrier).

Thus, the terminal assignments may be made in an order or prioritization according to traffic class requests. Requests received at block 1102 may include particular resource requests associated with particular classes of traffic for the relevant time duration (e.g., for the next epoch, Terminal A is requesting 100 resource units for voice over Internet Protocol (VoIP) traffic). The traffic class allocation may include a certain number of resource units allocated for all the terminals in the carrier group for VoIP traffic during the epoch. Rather than allocating these resource units across all the terminals of the carrier group, embodiments may assign them only to those terminals that have actually requested bandwidth for VoIP traffic in that epoch.

When time slots have been assigned to terminals, communications may occur at block 1125 according to the assignments. For example, the terminals in the terminal set may communicate with the satellite during the defined time duration in assigned time slots. In some embodiments, the satellite or NCC directs transmissions to the terminals indicating the respective time slot assignments. The terminals may then use that information to communicate on the uplink according to its assignment.

In some embodiments, as described above, the allocations and/or assignments of resources may be adjusted according to one or more factors. One such factor is communication mode. For example, at block 1130, a communication mode may be determined for communications with one or more of the terminals in the terminal set. The communication mode may then be used at block 1135 to adjust allocations and/or assignments of resource units (e.g., as a function of a selected modcode). Another such factor is terminal priority. For example, embodiments of the method 1100 assign time slices or other resources according to terminal orders dictated by a terminal priority.

Figure 12:
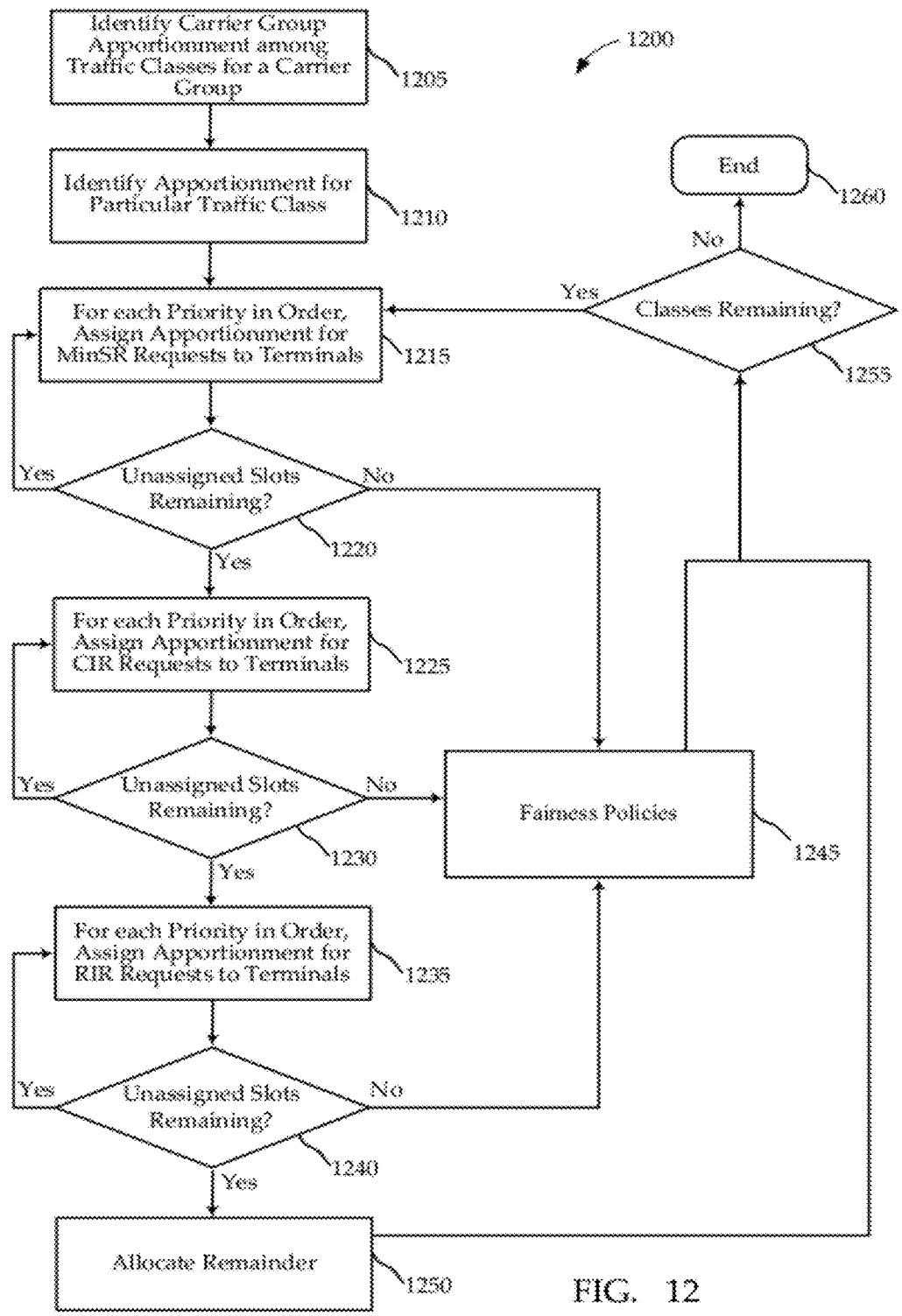
FIG. 12 is a flowchart illustrating a method of assigning, for an epoch, a set of slots for a carrier group to particular terminals.

FIG. 12 is a flowchart illustrating a method 1200 of assigning, for an epoch, a set of slots for a carrier group to particular terminals (e.g., the terminals 130 of FIG. 1). In the illustrated embodiment, the number of carrier group slots (e.g., the number of 80 MHz slots, or 20 MHz slots, or x MHz slots, as applicable to the terminal) assigned to each class for each particular terminal may be computed.

At block 1205, the apportionment of a carrier group among classes for an epoch is identified (e.g., for the satellite 105 of FIG. 6). The apportionment may be the apportionment of a given carrier group allocation among traffic classes, for example, as set forth in FIGS. 7-10. For each traffic class, the following assignment may occur each epoch (e.g., or more or less frequently). At block 1210, the apportionment for a particular traffic class is identified. At block 1215, the carrier group slots are assigned to particular terminals (e.g., for an epoch) based on the MinSR requests for the particular traffic class at each relevant terminal. In this embodiment, the relevant terminals may be a set or subset of terminals transmitting a particular carrier size (e.g., 80 MHz, 20 MHz, 5 MHz, or 1.67 MHz) within a given beam or set of beams. In one embodiment, each such terminal has a priority designation of 1, 2, or 3 (1 being the highest priority). The requested MinSR for the class at each priority 1 terminal may be assigned slots. If unassigned slots remain for the class in the carrier group, the requested MinSR bandwidth for the class at each priority 2 terminal may be assigned slots. If unassigned slots remain for the class in the carrier group, requested MinSR bandwidth for the class at each priority 3 terminal may be assigned slots. If, as indicated at block 1220, a determination is made during any of these allocations that insufficient slots remain for the class in the carrier group at that priority level, the MinSR requests for that priority level may be managed according to fairness policies 1245 (e.g., Proportional, Weighted Proportional, Fair Share, or Weighted Fair Share, which will be discussed in more detail below).

If unassigned slots remain for the class in the carrier group, at block 1225, the carrier group slots are assigned to terminals for an epoch based on the CIR requests for the particular traffic class at each relevant terminal. A CIR request may be the CIR request less the previously allocated MinSR. This CIR request value may equal min(CIR, RIR). The requested CIR for the class at each priority 1 terminal may be assigned slots. If unassigned slots remain for the class in the carrier group, the requested CIR bandwidth for the class at each priority 2 terminal may be assigned slots. If unassigned slots remain for the class in the carrier group, requested CIR bandwidth for the class at each priority 3 terminal may be assigned slots. If, as indicated at block 1230, a determination is made during any of these allocations that insufficient slots remain for the class in the carrier group at that priority level, the CIR requests for that priority level may be managed according to fairness policies 1245.

If unassigned slots remain for the class in the carrier group after the CIR requests are processed, at block 1235, the carrier group slots are assigned to terminals for an epoch based on the RIR requests for the particular traffic class at each relevant terminal. An RIR request may be the RIR request less the previously allocated MinSR and CIR. The requested RIR for the class at each priority 1 terminal may be assigned slots. If unassigned slots remain for the class in the carrier group, the requested RIR bandwidth for the class at each priority 2 terminal may be assigned slots. If unassigned slots remain for the class in the carrier group, requested RIR bandwidth for the class at each priority 3 terminal may be assigned slots. If, as indicated at block 1240, a determination is made during any of these allocations that insufficient slots remain for the class in the carrier group at that priority level, the RIR for that priority level may be apportioned according to fairness policies 1245. However, if it is determined that unassigned slots remain for the class in the carrier group at block 1240, the remaining slots may be assigned across terminals at block 1250 (e.g., on a round robin basis). Once an identified carrier group apportionment for a given class has been assigned to terminals, a determination may be made whether there is another class apportionment to be assigned to terminals at block 1255 (e.g., if the apportionment for Traffic Class 1 has been assigned to terminals, the apportionment for Traffic Class 2 may be initiated). If so, the method 1200 may resume from block 1210 for the new class; if not, the process may be terminated at block 1260 for the selected carrier group during the epoch. This method may be repeated (serially or in parallel) for other carrier groups.

The following pseudocode represents examples of the terminal assignment described above:

```
A[term*, class*] = 0
For each class do
    -- Allocate MinSR
    For each priority level p from high to low
        if (Sum(MinSR[term, class], for all terminals of priority p in
        CG) >= S then
            -- Insufficient resources to meet MinSR, use policy to
            allocate
            A[term*, class] = DBRAShare(S, MinSR[term*, class],
            PolicyCIRTerminal)
            done
        else
            -- Allocate MinSR
            A[term*, class] += MinSR[term, class] for each terminal
```

-continued

```
            S = S - allocations made in previous step
        endif
    endfor
    -- Allocate GIR (request below CIR)
    For L = 0 to numCIRLevels
        For each priority level p from high to low
            GIR[term, class, L] = max(min(RIR[term, class], CIR[term,
            class, L], 0) -
                        CIR[term, class, L-1], 0)
            -- CIR[term, class, -1]= minSR[term, class]
            if Sum(GIR[term, class, L], all terminals at priority p) >= S
            then
                -- Insufficient resources to meet GIR, use policy to
                allocate
                A[term*, class] += DBRAShare(S, GIR[term*, class,
                L], PolicyCIRTerminal)
                done
            else
                -- Allocate GIR
                A[term, class] += GIR[term, class, L] for each
                terminal
                S = S - allocations made in previous step
            endif
        Endfor
    Endfor
    -- Allocate EIR (request above CIR)
    EIR[term, class] = max(RIR[term, class] - CIR[term, class,
    maxLevel - 1], 0)
    if Sum(EIR[term, class], all terminals) >= S then
        -- Insufficient resources to meet EIR, use policy to allocate
        A[term*, class] += DBRAShare(S, EIR[term*, class],
        PolicyEIRTerminal)
        done
    else
        -- Allocate EIR
        A[term, class] += EIR[term, class] for each terminal
        S = S - allocations made in previous step
    endif
Endfor
A[term] = Sum(A[term, class], all classes)
```

Resource Sharing Policies

There are a number of policy options for resource sharing when available resources are insufficient to meet certain resource requests (e.g., aggregate MinSR, CIR, or RIR requests). In some embodiments, a sharing policy provides priority or weighted allocations to the certain classes. Allocations may also be in proportion to the CIR requests for one or more classes at one or more terminals. For traffic in excess of CIR, there may be a different allocation scheme. A number of other possible policies may be used in various embodiments, and such policies may be dynamically or more permanently configurable.

When resources are insufficient to meet aggregate MinSR, CIR, or RIR requests, there are a number of ways the available resources may be distributed. In one embodiment, one of the following resource sharing policies may be selected depending on when in the process there are insufficient resources: 1) A "Proportional" policy may distribute insufficient resources in a same percentage of a requested amount across a set of terminals (e.g., for a particular traffic class or a set of classes), or across a set of beams (e.g., among terminals of a given priority or set of priorities); 2) A "Weighted Proportional" policy may distribute insufficient resources in two or more different percentages across a set of terminals or across a set of beams (e.g., for a set of classes, voice or other preferred classes may receive a greater percentage, but the percentage amount may be the same for each class); 3) A "Fair Share" policy may distribute insufficient resources in a same amount across a set of terminals (e.g., for a particular traffic class or a set of classes), or across a set of beams (e.g., among terminals of a given priority or set of priorities), while ensuring that no allocation is more than requested; 4) A "Weighted Fair Share" policy may distribute insufficient resources in two or more same amounts across a set of terminals or across a set of beams (e.g., for a set of classes, voice or other preferred classes may receive a greater amount, but the amount may be the same for each class), while ensuring that no allocation is more than requested. Other policies may be used, such as a policy occurring when all requests have been filled and there is an extra share to be allocated, a set fraction may be distributed equally among groups.

As noted throughout this Disclosure, there are a number of instances when the above resource sharing policies may be implemented. In a given system (such as the system 600 of FIG. 6), different policies may be implemented at different steps in the process. The fairness policies 1045 for class pool sizing of FIG. 10 or the fairness policies 1245 for terminal assignment of FIG. 12 may be the resource sharing policies described above. During any of the allocations (e.g., at a given priority level, or at a particular traffic class), if there is insufficient MinSR, CIR, or RIR for that priority level (or at that traffic class), the resources may be allocated according to a Proportional, Weighted Proportional, Fair Share, Weighted Fair Share, or other policy. The policy being used may vary when there are different loads, or vary between different types of requests (e.g., CIR and RIR requests). For example, in some embodiments, the resource sharing policy may be selected according to the traffic class being requested (i.e., certain resource sharing policies may be more suited to certain traffic classes, in some cases).

Figure 13:
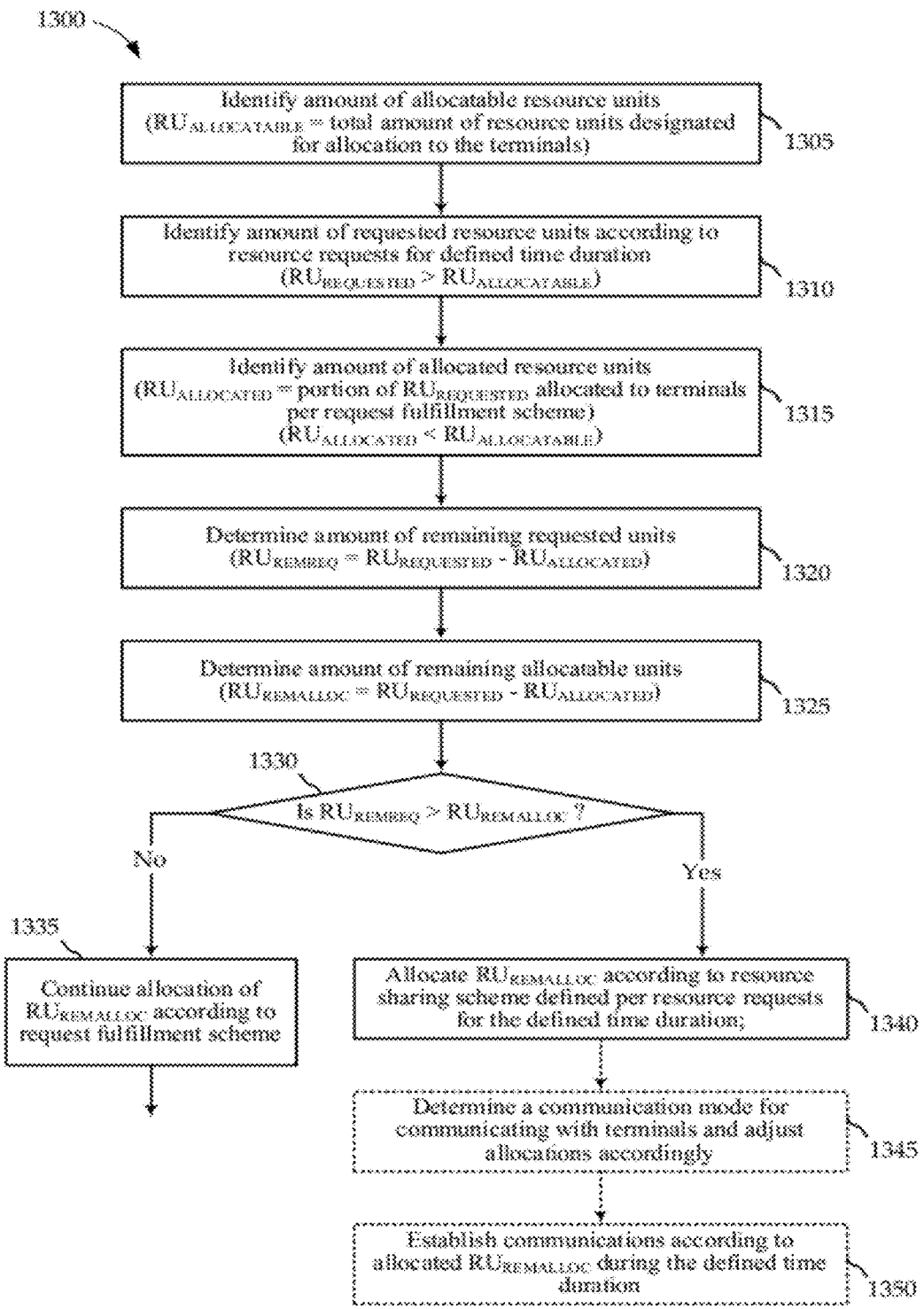
FIG. 13 is a flowchart illustrating a method for allocating bandwidth resources to terminals when insufficient resources are available to satisfy aggregate terminal requests, according to various embodiments.

FIG. 13 is a flowchart illustrating a method 1300 for allocating bandwidth resources to terminals when insufficient resources are available to satisfy aggregate terminal requests, according to various embodiments. Embodiments of the method 1300 begin at block 1305 by identifying an amount of allocatable resource units ($RU_{ALLOCATABLE}$). For example, $RU_{ALLOCATABLE}$ may represent the amount of available resources on the system for allocation to the terminals (e.g., in satisfaction of resource requests), represented in resource units. In certain embodiments, $RU_{ALLOCATABLE}$ represents the total amount of bandwidth resources less any resources needed for purposes other than terminal allocation.

In other embodiments, $RU_{ALLOCATABLE}$ is defined in terms of a particular request fulfillment scheme. The request fulfillment scheme may include some or all of a traffic class allocation, terminal assignment, or other type of resource allocation or assignment, for example, according to requests for a time duration. For example, the request fulfillment scheme may include one or more allocation steps of relatively fine granularity (e.g., a traffic class allocation for CIR requests for traffic class 1, an assignment of time slots to priority 1 terminals to satisfy MinSR requests, etc.), or one or more allocation steps of relatively coarse granularity (e.g., a traffic class allocation for all of traffic class 1, an assignment of time slots to all terminals for CIR requests, etc.). As such, $RU_{ALLOCATABLE}$ may indicate the amount of bandwidth resources designated for allocation according to that particular allocation step or steps.

At block 1310, an amount of requested resource units ($RU_{REQUESTED}$) is identified. For example, an amount of requested resource units requested by the plurality of terminals is determined according to predictions or received requests associated with terminals in the terminal set for an epoch. Where $RU_{REQUESTED}$ and $RU_{ALLOCATABLE}$ represent aggregate amounts of bandwidth for the system, it may be assumed in some embodiments that $RU_{REQUESTED}$ exceeds $RU_{ALLOCATABLE}$, such that there are insufficient resources available to satisfy the aggregate requests. In other embodiments, $RU_{REQUESTED}$ may be determined with respect to the particular request fulfillment scheme (e.g., allocation step). For example, $RU_{REQUESTED}$ may indicate the amount of resources requested by all terminals for CIR for a given class with a particular carrier group, and $RU_{ALLOCATABLE}$ may indicate the amount of resources allocatable for the given class with the particular carrier group.

At block 1315, an amount of allocated resource units ($RU_{ALLOCATED}$) is determined. For example, as described above, resources may be allocated to carrier groups and/or traffic classes, and those allocations may be used to assign resources to terminals, in various ways. The allocations may have allocation steps, at which amounts of resource units are allocated (e.g., to a traffic class, set of terminals, etc.). The amount of resource units that has been allocated for the time duration at the end of each allocation step may be represented by $RU_{ALLOCATED}$. As such, $RU_{ALLOCATED}$ will be less than $RU_{ALLOCATABLE}$ and $RU_{REQUESTED}$.

By way of example, the request fulfillment scheme may be a series of allocation steps for allocating bandwidth to fulfill CIR requests for all terminals by terminal priority. $RU_{ALLOCATABLE}$ may represent the bandwidth resources designated for allocation to fulfill the requests for the terminals. Allocations have already been made for CIR requests from priority 1 terminals, and the current allocation step is for CIR requests from remaining (e.g., priorities 2-N) terminals. $RU_{ALLOCATED}$ may indicate the portion of $RU_{ALLOCATABLE}$ that has already been allocated, which may be the amount of bandwidth resources allocated for CIR requests from priority 1 terminals.

Various allocation and/or assignment techniques may also include processes that have decision points, at which a determination is made as to whether sufficient resources remain for the next allocation step in the process. At block 1320, the portion of $RU_{REQUESTED}$ remaining for allocation according to the request fulfillment scheme ($RU_{REMREQ}$) is determined. For example, 500 bandwidth units of CIR requests may actually include 200 bandwidth units of priority 1 CIR allocations and 300 bandwidth units of CIR requests for other terminals. If the priority 1 allocations are already made, $RU_{ALLOCATED}$ may indicate the 200 allocated bandwidth units, and $RU_{REMREQ}$ may indicate the 300 requested CIR bandwidth units left to be allocated.

At block 1325, the portion of $RU_{ALLOCATABLE}$ remaining for allocation according to the request fulfillment scheme ($RU_{REMALLOC}$) is determined. For example, 400 bandwidth units are set aside for allocations (e.g., $RU_{ALLOCATABLE}=400$), and 200 bandwidth units have already been allocated for priority 1 CIR (e.g., $RU_{ALLOCATED}=200$), leaving 200 bandwidth units for allocation to remaining terminals (e.g., $RU_{REMALLOC}=200$). For example, according to the method 1200 of FIG. 12, various decision points exist (e.g., blocks 1220, 1230, and 1240), at which resource sufficiency is evaluated. In some embodiments, at each of those decision points $RU_{REMALLOC}$ and/or $RU_{REMREQ}$ are determined.

In another example, in a particular epoch, 800 bandwidth units are requested by all terminals for CIR (e.g., $RU_{REQUESTED}=800$), including 200 bandwidth units requested by priority 1 terminals, and 600 bandwidth units requested by terminals having other priorities. Based on resource limitations, traffic class allocations, etc., 400 bandwidth units are set aside to satisfy such requests (e.g., $RU_{ALLOCATABLE}=400$) for the epoch. At a particular decision point in the request fulfillment scheme, 200 bandwidth units have already been allocated for priority 1 CIR (e.g., $RU_{ALLOCATED}=200$), leaving 200 bandwidth units for allocation to remaining terminals for CIR (e.g., $RU_{REMALLOC}=200$). Notably, while $RU_{REMALLOC}=200$, the number of bandwidth units needed to fulfill the remainder of the aggregate CIR requests is actually 600 (e.g., $RU_{REMREQ}=RU_{REQUESTED}-RU_{ALLOCATED}=600$). Thus, insufficient allocatable resources remain to fulfill the remainder of the aggregate requests according to the request fulfillment scheme.

At various points in the request fulfillment scheme (e.g., at the end, at one or more decision points, etc.), a determination is made at block 1330 as to whether sufficient bandwidth resources exist to fulfill requests. In some embodiments, this determination is made by evaluating whether the remaining amount of requested bandwidth $RU_{REMREQ}$ is greater than the remaining amount of allocatable bandwidth $RU_{REMALLOC}$, for example, for the particular step or steps of the request fulfillment scheme. Where sufficient resources remain to satisfy the step, the allocation may continue according to the request fulfillment scheme (e.g., the next allocation step may be carried out) at block 1335. When insufficient resources remain, allocation (e.g., the next allocation step, a next series of allocation steps, all similar allocation steps, all remaining allocations, etc.) may instead proceed according to a resource sharing policy at block 1340.

In some embodiments, allocations may be adjusted according to additional factors. In one embodiment, at block 1345, a communication mode for communicating with terminals may be determined, and allocations may be adjusted accordingly. For example, the communication mode may identify a burst size, a modcode, and/or other information that may impact available resources or communication parameters. Also, in some embodiments, communications are established and/or carried out according to allocated $RU_{REMALLOC}$ during the defined time duration.

It will be appreciated that $RU_{REMALLOC}$ may be allocated in a number of different ways. As described above, when insufficient resources remain (e.g., where $RU_{REMALLOC}<RU_{REMREQ}$), $RU_{REMALLOC}$ may be allocated according to a resource sharing policy at block 1340. For example, one or more resource sharing policies may be selected and applied to fairly or otherwise allocate the insufficient remaining allocatable resources.

Figure 14:
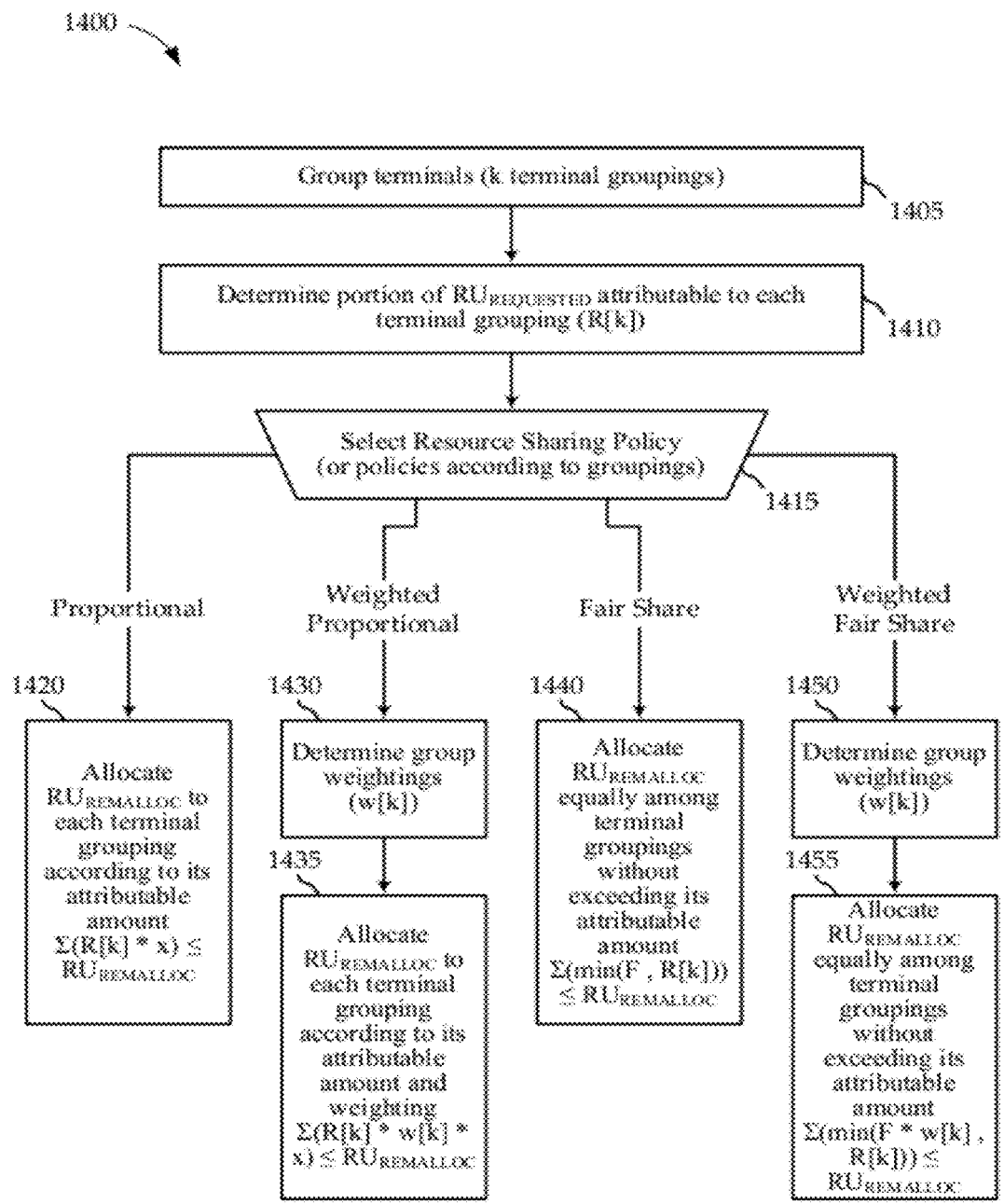
FIG. 14 is a flowchart illustrating a method for selecting and applying a resource sharing policy when insufficient resources are available to satisfy aggregate terminal requests, according to various embodiments.

FIG. 14 is a flowchart illustrating a method 1400 for selecting and applying a resource sharing policy when insufficient resources are available to satisfy aggregate terminal requests, according to various embodiments. Embodiments of the method 1400 begin at block 1405 by grouping requests. For example, the groupings may be according to carrier group, traffic class, terminals priority, and or any other useful designation. In some embodiments, the requests are grouped into k groupings.

It will be appreciated that, of the aggregate resource requests from all the terminals, each grouping may be attributed with some portion of the aggregate requests. For example, $RU_{REQUESTED}$ may be divided into k portions, each representing the portion of $RU_{REQUESTED}$ attributable to the terminals in each of the respective k groupings. At block 1410, the attributable portion of the requests for each group (R[k]) is determined. At block 1415, one or more resource sharing policies are selected. In some embodiments, the resource sharing policies are selected as a function of the groupings (e.g., certain policies may be applied according to terminal priority, traffic class, etc.). In other embodiments, the resource sharing policies are selected according to other factors (e.g., one policy may always be used, or certain policies may be more suited to a particular step of a type of request fulfillment scheme, etc.).

In the illustrative method 1400, the selection in block 1415 is made among four types of resource sharing policies: Proportional, Weighted Proportional, Fair Share, and Weighted Fair Share. These policies are described above, and illustrative pseudocode for implementing these policies is represented as follows:

```
Input parameters -
    Rmax -           Total number of resource units
    R[k*] -          Resource Request Values for each group k
    Policy -         {WProportional, Proportional, WFS, FS}
    HighPriorityGroupList -
                     {group, ...}
    w[k*] -          Weight value for each group k. Used when Policy =
                     WProportional or WFS
Output -
    A[k*] -          Resource allocation for each group k
    If Policy = WProportional, then
        A[k] = R[k] * w[k] * x, x is largest value possible so that
    sum(A[k]) <= RMax;
    If Policy = Proportional, then
        A[k] = R[k] * x, x is largest value possible so that sum(A[k]) <=
        RMax
    If Policy = WeightedFS, then
        A[k] = min(w[k] * F, R[k]), F is largest value possible so that
    sum(A[k]) <= RMax
    If Policy = FS, then
        A[k] = min(F, R[k]), F is largest value possible so that
    sum(A[k]) <= RMax
```

According to a first possible branch of the method 1400, a proportional resource sharing policy is implemented. At block 1420, $RU_{REMALLOC}$ is allocated to each terminal grouping according to its attributable amount (e.g., $\Sigma(R[k]*x) \leq RU_{REMALLOC}$) For example, implementing block 1420 may include calculating a constant (x) to have a maximum value while holding that, when the constant is multiplied by the sum of the attributable amount of requested resource units for the set of terminal groupings (R[k]), the product is less than the amount of remaining resource units ($RU_{REMALLOC}$).

According to a second possible branch of the method 1400, a weighted proportional resource sharing policy is implemented. At block 1430, a set of weightings is determined for each grouping (w[k]). For example, terminal groupings having higher priority may be associated with higher weighting factors. The allocatable amounts may then be adjusted according to the weighting factor (w[k]*R[k]). At block 1435, $RU_{REMALLOC}$ is allocated according to its weighted attributable amount (e.g., $(R[k]*w[k]*x) \leq RU_{REMALLOC}$) As described above, this allocation may include identifying a constant (x) to have a maximum value while holding that, when the constant is multiplied by the sum of the weighted attributable amounts of requested resource units for each set of terminal groupings (w[k]*R[k]), the product is less than the amount of remaining resource units ($RU_{REMALLOC}$).

According to a third possible branch of the method 1400, a fair share resource sharing policy is implemented. At block 1440, $RU_{REMALLOC}$ is allocated equally among the terminal groupings without exceed the amount attributable to any of the groupings (e.g., $\Sigma(\min(F, R[k])) \leq RU_{REMALLOC}$). According to a fourth possible branch of the method 1400, a weighted fair share resource sharing policy is implemented. At block 1450, a set of weightings is determined for each grouping (w[k]). The allocatable amounts may then be adjusted according to the weighting factor (w[k]*R[k]), and multiple groupings may be associated with the same weighting factor. At block 1455, $RU_{REMALLOC}$ is allocated substantially equally among the terminal groupings sharing weighting factors without exceeding the amount attributable to any of the groupings having that shared weighting factor (e.g., $\Sigma(\min(F, R[k])) \leq RU_{REMALLOC}$). For example, the k groupings may be split into k/w groups, where w is the number of weighting factors. A fair share policy may then be applied separately to each of the k/w groupings.

It will be appreciated that other resource sharing policies are possible. For example, a fraction of $RU_{REMALLOC}$ may be allocated proportionally, and the remainder may be allocated according to a fair share policy. Examples of other possible resource sharing policies are described by the following illustrative pseudocode:

```
Input parameters -
    Rmax -      Total number of resource units
    w[k*] -     Weight values for each group
    F           Fraction of Rmax shared equally among groups
    K           Number of groups
Output -
    A[k*] -     Resource assignments
Algorithm -
    -- Share F fraction of Rmax equally among groups
    A1[k] = Rmax * F / K for each k
    -- Share 1-F fraction of Rmax in weighted proportion
    A2[k] += w[k] * x, x is largest value possible so that sum(A2[k]) <=
    RMax * (1 - F)
A[k] = A1[k] + A2[k] for each k
```

Any of the functionality described above with reference to the satellite 105, terminals 130, or NCC 140 of FIG. 6, or components thereof (e.g., the request processing module(s) 620, allocation module(s) 630, etc.), may be implemented in one or more Application Specific Integrated Circuits (ASICs), or in one or more general purpose processors adapted to perform the applicable functions. Alternatively, the functions of a satellite 105 may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for allocating bandwidth resources in a satellite communications system having a plurality of terminals, the plurality of terminals being in communication with a satellite over a communication channel defined according to a channel bandwidth, the bandwidth resources defined in resource units, the method comprising:
    identifying channel resources for a defined time duration for the communication channel, the channel resources comprising a number of time slots of the channel bandwidth;
    identifying a plurality of carrier groups including a first carrier group associated with a first carrier bandwidth less than the channel bandwidth and a second carrier group associated with a second carrier bandwidth different from the first carrier bandwidth;
    identifying a set of terminals from among the plurality of terminals, the set of terminals being associated with the first carrier group;
    identifying a first carrier group allocation comprising a number of allocated time slots of the first carrier bandwidth for the defined time duration;
    identifying a traffic class allocation associated with the first carrier group allocation based at least in part on one or more committed information rates associated with the set of terminals, the traffic class allocation designating an allocation of resource units of the first carrier group allocation among a plurality of traffic classes for the first carrier group;
    for the defined time duration, assigning the allocated time slots of the first carrier group allocation to each terminal of the set of terminals according to an amount of resource units requested by respective terminals of the set of terminals for the defined time duration and as a function of the traffic class allocation associated with the first carrier group allocation; and transmitting information directed to at least one terminal of the set of terminals identifying the time slots assigned to the at least one terminal.

2. The method of claim 1, further comprising:

determining an amount of requested resource units requested by the terminals of the set of terminals for the defined time duration at least according to resource requests received from each of the terminals.

3. The method of claim 2, wherein the amount of requested resource units for the defined time duration is different from an amount of requested resource units for a prior time duration, the amount of requested resource units for the prior time duration being determined according to prior resource requests, such that the assigned time slots for the defined time duration are different from time slots assigned for the prior time duration.

4. The method of claim 3, wherein the defined time duration is substantially adjacent to the prior time duration.

5. The method of claim 1, wherein assigning the allocated time slots of the first carrier group allocation to each terminal of the set of terminals according to the amount of resource units requested by the terminals of the set of terminals for the defined time duration and as a function of the traffic class allocation associated with the carrier group allocation comprises:

receiving a resource request from at least one of the terminals, the resource request comprising a traffic class request identifying at least one traffic class associated with an amount of resource units requested by the at least one of the terminals; and assigning allocated time slots to the at least one of the terminals further according to the traffic class request.

6. The method of claim 1, further comprising:

identifying a terminal prioritization scheme associating a terminal priority with each terminal of the set of terminals; and assigning the allocated time slots of the first carrier group allocation to the set of terminals further as a function of the terminal prioritization scheme.

7. The method of claim 6, wherein assigning the allocated time slots of the first carrier group allocation to the set of terminals further as a function of the terminal prioritization scheme comprises:

for each terminal priority in an order defined according to the terminal priority scheme, assigning allocated time slots to each terminal of the set of terminals associated with the terminal priority according to the traffic class allocation.

8. The method of claim 7, further comprising:

for each terminal priority, upon completion of assigning the allocated time slots of the first carrier group allocation for the set of terminals associated with the terminal priority, determining whether sufficient unassigned allocated time slots remain for allocation according to a next terminal priority; and when insufficient unassigned allocated time slots remain for allocation according to the next terminal priority, assigning remaining unassigned allocated time slots according to a fairness policy.

9. The method of claim 6, wherein:

the traffic class allocation identifies a plurality of traffic class apportionments, each traffic class apportionment defining an amount of the resource units allocated to each of the plurality of traffic classes and being associated with a traffic class apportionment priority; and assigning the allocated time slots of the first carrier group allocation to the set of terminals further as a function of the terminal prioritization scheme comprises:

for each terminal priority in an order defined according to the terminal priority scheme, assigning allocated time slots to each terminal of the set of terminals associated with the terminal priority according to the traffic class allocation for each traffic class apportionment in an order defined according to the associated traffic class apportionment priorities.

10. The method of claim 9, further comprising:

for each traffic class apportionment, upon completion of assigning a portion of the allocated time slots of the first carrier group allocation for the traffic class apportionment for the terminals associated with the terminal priority, determining whether sufficient unassigned allocated time slots remain for allocation according to a next traffic class apportionment; and when insufficient unassigned allocated time slots remain for allocation according to a next traffic class apportionment, assigning remaining unassigned time slots according to a fairness policy.

11. The method of claim 1, wherein the amount of resource units requested by respective terminals of the set of terminals include:

a minimum sustained rate associated with the amount of resource units;

a committed information rate associated with the amount of resource units; and a requested information rate associated with the amount of resource units.

12. The method of claim 1, further comprising:

determining a communication mode for communicating with at least a portion of the set of terminals; and assigning the allocated time slots of the first carrier group allocation to the set of terminals further as a function of the communication mode.

13. A resource allocation system for allocating bandwidth resources in a satellite communications system having a plurality of terminals, the plurality of terminals being in communication with a satellite over a communication channel defined according to a channel bandwidth, the bandwidth resources defined in resource units, the resource allocation system comprising:

an allocation module operable to:

identify channel resources for a defined time duration for the communication channel, the channel resources comprising a number of time slots of the channel bandwidth;

identify a plurality of carrier groups including a first carrier group associated with a first carrier bandwidth less than the channel bandwidth and a second carrier group associated with a second carrier bandwidth different from the first carrier bandwidth;

identify a set of terminals from among the plurality of terminals, the set of terminals being associated with the first carrier group of the plurality of carrier groups;

identify a first carrier group allocation comprising a number of allocated time slots of the first carrier bandwidth for the defined time duration;

identify a traffic class allocation associated with the first carrier group allocation based at least in part on one or more committed information rates associated with the set of terminals, the traffic class allocation designating an allocation of resource units among a plurality of traffic classes for the first carrier group; and for the defined time duration, assign the allocated time slots of the first carrier group allocation to each terminal of the set of terminals according to an amount of resource units requested by the terminals of the set of terminals for the defined time duration and as a function of the traffic class allocation associated with the carrier group allocation; and a communications module, communicatively coupled with the allocation module, and operable to transmit information directed to at least one terminal of the set of terminals identifying the allocated time slots assigned to the at least one terminal.

14. The resource allocation system of claim 13, wherein the allocation module and the communications module are located in the satellite.

15. The resource allocation system of claim 13, wherein the allocation module and the communications module are located terrestrially in a network control system communicatively coupled with at least one of the set of terminals.

16. The resource allocation system of claim 13, wherein the allocation module is further operable to assign allocated time slots to the set of terminals for each of a set of time durations, the defined time duration being one of the set of time durations.

17. The resource allocation system of claim 13, further comprising:
a request processing module, operable to determine the amount of requested resource units requested by the plurality of terminals for the defined time duration at least according to resource requests received from each of the plurality of terminals.

18. The resource allocation system of claim 13, wherein the allocation module is further operable to:
identify a terminal prioritization scheme associating a terminal priority with each terminal of the set of terminals; and
assign the allocated time slots of the first carrier group allocation to the set of terminals further as a function of the terminal prioritization scheme.

19. The resource allocation system of claim 18, wherein the allocation module is further operable to assign the allocated time slots of the first carrier group allocation to the set of terminals further as a function of the terminal prioritization scheme by:
for each terminal priority in an order defined according to the terminal priority scheme, assigning allocated time slots to each terminal of the set of terminals associated with the terminal priority according to the traffic class allocation.

20. The resource allocation system of claim 19, wherein the allocation module is further operable to assign the allocated time slots of the first carrier group allocation to the set of terminals further as a function of the terminal prioritization scheme further by:
for each terminal priority, upon completion of assigning allocated time slots for the terminals associated with the terminal priority, determining whether sufficient unassigned allocated time slots remain for allocation according to a next terminal priority; and
when insufficient unassigned allocated time slots remain for allocation according to the next terminal priority, assigning remaining unassigned allocated time slots according to a fairness policy.

21. The resource allocation system of claim 13, wherein the communications module is further operable to:
determine a communication mode for communicating with the set of terminals,
wherein the allocation module is further operable to assign the allocated time slots of the first carrier group allocation to the set of terminals further as a function of the communication mode.

22. A satellite communications system comprising:
a satellite configured to communicate over a plurality of communication channels;
a plurality of terminals, each terminal being in communication with the satellite over a communication channel of the plurality of communication channels, the communication channel associated with a channel bandwidth, a subset of the plurality of terminals being associated with a first carrier group of a plurality of carrier groups;
and a resource allocation device, communicatively coupled with the plurality of terminals, and comprising an allocation module operable to:
identify channel resources for a defined time duration for the communication channel, the channel resources comprising a number of time slots of the channel bandwidth;
identify a first carrier bandwidth associated with the first carrier group, the first carrier bandwidth less than the channel bandwidth;
identify a second carrier bandwidth associated with a second carrier group, the second carrier bandwidth different from the first carrier bandwidth;
identify a first carrier group allocation associated with the first carrier group, the first carrier group allocation comprising a number of allocated time slots of the first carrier bandwidth for the defined time duration;
identify a traffic class allocation associated with the first carrier group allocation based at least in part on one or more committed information rates associated with the subset of terminals, the traffic class allocation designating an allocation of the allocated time slots among a plurality of traffic classes according to a set of resource obligations associated with each of the plurality of traffic classes; and
for a defined time duration, assign the allocated time slots of the first carrier group allocation to each terminal of the subset of terminals according to an amount of resource units requested by respective terminals of the subset of terminals for the defined time duration and as a function of the traffic class allocation associated with the carrier group allocation.

23. The satellite communications system of claim 22, wherein the resource allocation device further comprises:
a communications module, communicatively coupled with the allocation module, and operable to transmit information directed to at least one terminal of the set of terminals identifying the allocated time slots assigned to the at least one terminal.

24. The satellite communications system of claim 22, wherein the resource allocation device is operable to dynamically assign allocated time slots to the set of terminals for each of a set of epochs, each epoch having a constant and predefined time duration.

* * * * *